(12) United States Patent
Germond

(10) Patent No.: US 9,888,250 B2
(45) Date of Patent: Feb. 6, 2018

(54) TECHNIQUES FOR IMAGE BITSTREAM PROCESSING

(71) Applicant: INTEL CORPORATION, Santa Clara, CA (US)

(72) Inventor: Cyril Germond, Mougins (FR)

(73) Assignee: INTEL CORPORATION, Santa Clara, CA (US)

( * ) Notice: Subject to any disclaimer, the term of this patent is extended or adjusted under 35 U.S.C. 154(b) by 474 days.

(21) Appl. No.: 14/382,100

(22) PCT Filed: Dec. 18, 2013

(86) PCT No.: PCT/IB2013/002946
§ 371 (c)(1),
(2) Date: Aug. 29, 2014

(87) PCT Pub. No.: WO2015/092461
PCT Pub. Date: Jun. 25, 2015

(65) Prior Publication Data
US 2016/0191925 A1   Jun. 30, 2016

(51) Int. Cl.
*H04N 7/12*        (2006.01)
*H04N 19/186*    (2014.01)
*H04N 19/70*      (2014.01)
*H04N 19/46*      (2014.01)
*H04N 19/176*    (2014.01)
*H04N 19/18*      (2014.01)
(Continued)

(52) U.S. Cl.
CPC ......... *H04N 19/186* (2014.11); *H04N 19/176* (2014.11); *H04N 19/18* (2014.11); *H04N 19/182* (2014.11); *H04N 19/184* (2014.11); *H04N 19/44* (2014.11); *H04N 19/46* (2014.11); *H04N 19/70* (2014.11); *H04N 19/91* (2014.11)

(58) Field of Classification Search
CPC .... H04N 19/176; H04N 19/18; H04N 19/182; H04N 19/184; H04N 19/186
See application file for complete search history.

(56) References Cited

U.S. PATENT DOCUMENTS 5,864,682 A    1/1999  Porter et al.
6,608,933 B1  8/2003  Dowell et al.
(Continued)

OTHER PUBLICATIONS

International Search Report and Written Opinion received for PCT Patent Application No. PCT/IB2013/002946, dated Sep. 26, 2014, 12 pages.

*Primary Examiner* — Nhon Diep

(57) ABSTRACT

Various embodiments are generally directed to techniques for reducing processing and/or storage resource requirements for retrieving an image from an image bitstream. A device to display compressed images includes a parsing component to parse a comment block of stream data to locate an entry associated with an image of multiple images, the stream data comprising an image bitstream of the multiple images, and the entry comprising a pointer to a location within the image bitstream at which a block of coefficients of a minimum coded unit (MCU) of the image begins and an indication of a coefficient of the block of coefficients; and a decoding component to retrieve the MCU from the image bitstream and employ the indication to decode the block of coefficients. Other embodiments are described and claimed.

24 Claims, 15 Drawing Sheets

(51) Int. Cl.
*H04N 19/182* (2014.01)
*H04N 19/184* (2014.01)
*H04N 19/44* (2014.01)
*H04N 19/91* (2014.01)

(56) References Cited

U.S. PATENT DOCUMENTS

| | | | |
|---|---|---|---|
| 8,902,992 B2 * | 12/2014 | Goetting | H04N 19/60 375/240.12 |
| 2005/0008236 A1 | 1/2005 | Hachiyama et al. | |
| 2014/0341302 A1 * | 11/2014 | Wang | H04N 19/176 375/240.26 |
| 2016/0165248 A1 * | 6/2016 | Lainema | H04N 19/70 375/240.08 |

* cited by examiner

TECHNIQUES FOR IMAGE BITSTREAM PROCESSING

CROSS REFERENCING TO RELATED APPLICATION(S)

The present application is claiming priority from International Patent Application No. PCT/IB2013/002946, filed on Dec. 18, 2013, entitled "TECHNIQUES FOR IMAGE BITSTREAM PROCESSING" incorporated by reference herein in its entirety

TECHNICAL FIELD

Embodiments described herein generally relate to reducing processing and/or storage requirements in accessing still images encoded within a compressed image bitstream.

BACKGROUND

Various forms of image compression have been devised to compress sets of still images for storage and/or transmission, including various versions of the Joint Photographic Experts Group (JPEG) specification promulgated by the International Organization for Standardization and the International Electrotechnical Commission (ISO/IEC). Image compressors conforming to this specification and/or similar specifications compress multiple still images through a combination of discrete-cosine transform (DCT), quantization and entropy encoding into a single image bitstream of coefficients representing blocks of pixels of each still image in the frequency domain.

Unfortunately, to achieve a relatively high degree of compression, such image bitstreams are usually organized in a manner that prohibits accessing and decoding of only one of the still images selected along its length at any location other than at its beginning. More simply, such image bitstreams are architected to require sequential accessing and decoding of the still images starting at the beginning, and not to enable "random" accesses at various points therealong.

The locations of the first coefficient(s) of each of the images typically do not start at regular or otherwise predictable intervals. Instead, the placement of the first coefficient(s) of each still image is determined largely (if not exclusively) by the quantity of bits employed to encode preceding still image(s) by the entropy encoding. Also, the value of each coefficient is typically specified as a difference from the value of the preceding coefficient extending all the way back to the very first coefficient of the very first still image. Thus, finding the location of the first coefficient(s) of a particular still image and interpreting the values of the coefficients of that particular still image requires accessing and decoding coefficients starting at the beginning of the image bitstream with the very first coefficient of the very first image, and progressing onward until the coefficients of the particular image are reached.

The requirement of such sequential access and decoding can require considerable processing and/or storage resources. Further, as cameras with higher resolutions, storage media with higher capacities and networks with higher data transfer rates have all become more commonplace, the quantity of still images stored in such image bitstreams and the size of each of those still images have both continued to increase. As a result, such image bitstreams have continued to become ever larger, thereby exacerbating the already considerable processing and/or storage resources required simply to retrieve a single still image from within such image bitstreams.

DETAILED DESCRIPTION

Figure 1:
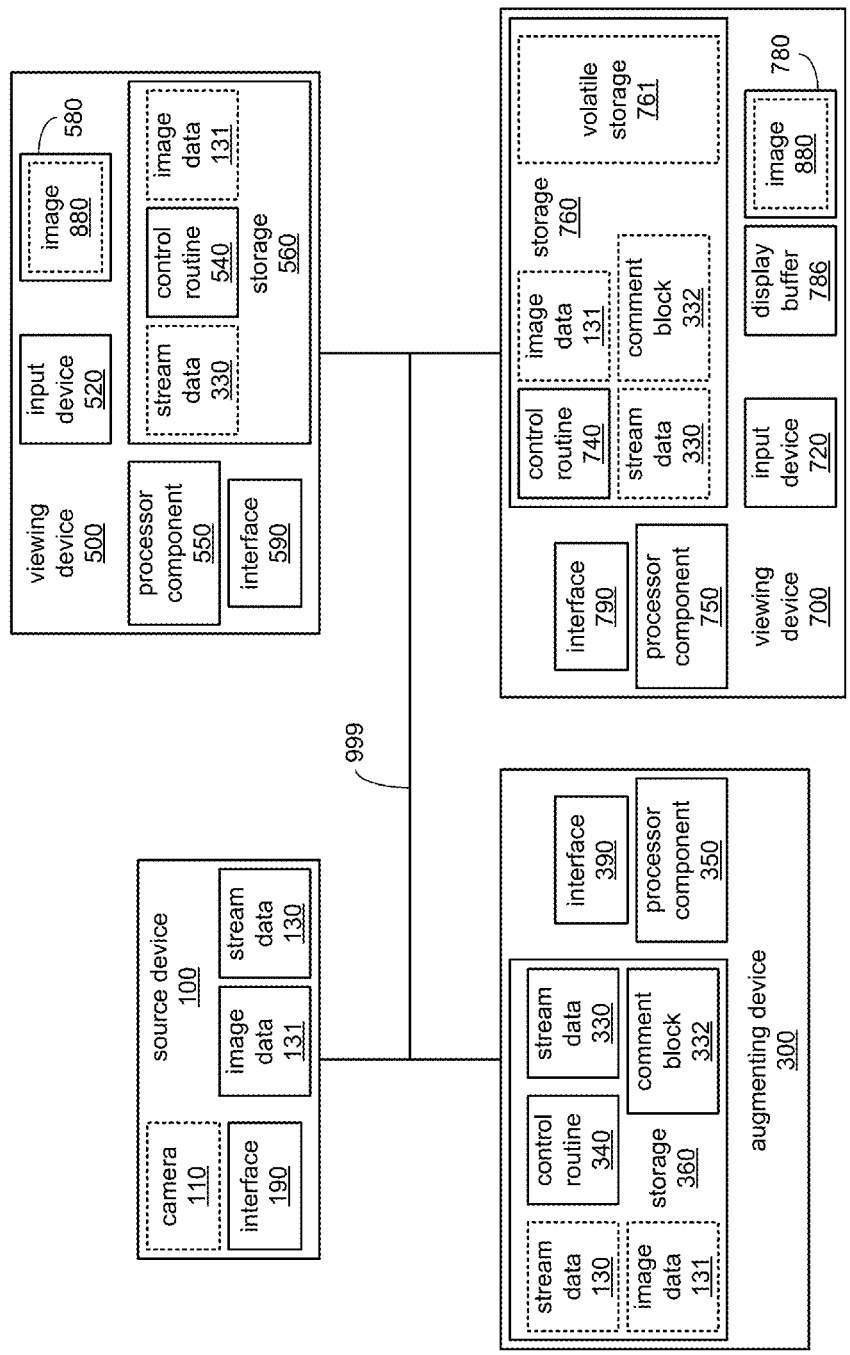
FIG. 1 illustrates an embodiment of an image processing system.

Various embodiments are generally directed to techniques for reducing processing and/or storage resource requirements for retrieving an image from an image bitstream. A set of entries that include pointers to and coefficient values for at least the first coefficient(s) of each image is added to a header of an image bitstream as a comment block to ensure that the inclusion of such information does not cause compatibility issues with decoders that make no use of such information. Such a comment block may be included in an image bitstream as it is created, or may be added to an existing image bitstream.

In some embodiments, and depending on the particular still image compression specification employed in generating an image bitstream, each image may be divided into two-dimensional blocks of pixels such as the minimum coded units (MCUs) of various versions of JPEG. In such embodiments, the first one or more coefficients of an image may correspond in their position in the image to one or more pixels of the first MCU of the image, and the first MCU may be in the upper left-hand corner of the image. Further, the first coefficient of each block of coefficients making up each MCU of the image, including the first MCU, may be DC coefficients.

The comment block may be divided into entries, each of which includes at least one pointer and at least one coefficient value. In some embodiments, there may be a single entry per image in which a pointer points to the first coefficient of one of what may be multiple blocks of coefficients of the first MCU of the image, and in which there is a DC coefficient value for the first coefficient of at least one those multiple blocks of coefficients. Further, while DC coefficient values may be specified within the blocks of coefficients within each MCU as a difference from DC coefficient values of corresponding blocks of coefficients of the preceding MCU, each of the DC coefficient values of the entries of the comment block may be specified in a stand-alone manner without reference to any other coefficient value.

In other embodiments, there may be an entry in the comment block for each horizontal row of MCUs in each image. In such embodiments, the pointer(s) of each entry may point to the first coefficient(s) of block(s) of coefficients of the first MCU (e.g., the left-most MCU) in each of the horizontal rows of MCUs. Again, the coefficient value(s) of each entry may specify one or more DC coefficient values of the first MCU of one of the horizontal rows of MCUs (e.g., the left-most MCU of a row) without reference to any other DC coefficient value.

In still other embodiments, there may be an entry in the comment block for each MCU in each image. In such embodiments, the pointer(s) of each entry may point to the first coefficient(s) of blocks of coefficients of its corresponding MCU, and the coefficient value(s) may specify DC coefficient value(s) of the first coefficient(s).

The entries of the comment block may be generated from an existing image bitstream. At least the image data of the bitstream may be sequentially accessed and decoded, and an entry may be generated for at least each image that is found, if not for every horizontal line of each image that is found, or for every MCU that is found. A new image bitstream may then be generated in which the header includes a comment block made up of the generated entries. In some embodiments, the comment block may be entropy encoded to reduce its size within the new image bitstream.

In viewing a particular image of an image bitstream that includes such a comment block, the comment block may be parsed to locate at least the entry corresponding to the first MCU of the particular image. In some embodiments, the comment block may need to be decoded via at least an entropy decoder before being parsed. In embodiments in which retrieval of the entirety of the particular image is desired, then MCUs of the particular image may be retrieved and decoded for viewing starting with the MCU pointed to by the entry.

In embodiments in which only a portion of the particular image is desired to be viewed, then a subset of the MCUs of the particular image are retrieved and decoded for viewing. In embodiments in which there is only one entry in the comment block per image, MCUs of the particular image starting with the first MCU of the particular image are retrieved and decoded until the last of the MCUs that correspond to the desired portion of the image have been retrieved and decoded. During such retrieval and decoding, ones of the retrieved and decoded MCUs that do not correspond to the desired portion of the particular image are discarded after being decoded to calculate their DC coefficients for use in calculating the DC coefficients of following MCUs.

However, in embodiments in which there is an entry for the first MCU of every horizontal line of MCUs of each image, only MCUs of the horizontal lines of MCUs that correspond to the desired portion of the particular image are retrieved and decoded. For each such horizontal line, such retrieving and decoding begins with the first MCU and proceeds along each such horizontal line until the last MCU of that line that corresponds to the desired portion of the particular image is retrieved and decoded. During such retrieval and decoding, ones of the retrieved and decoded MCUs in each of those lines that do not correspond to the desired portion of the particular image are discarded after being decoded to calculate their DC coefficients for use in calculating the DC coefficients of the following MCUs of that line.

In each case in which MCUs of an image are retrieved, such retrieval may entail retrieving and decoding only a subset of the MCUs at a time. Each such subset may be selected at least partly to fit within a single storage page of a volatile portion of a storage (e.g., within a single four kilobyte storage page of a dynamic random access memory system). This may be done instead of simply retrieving all or a large proportion of the MCUs at once to enhance performance in the processing of MCUs by avoiding delays that may be incurred in repeatedly changing which of such storage pages are accessed while processing one or more of the MCUs.

As part of viewing an image or a portion of an image of an image bitstream, it may be desired to rotate or interpolate (e.g., zoom into or zoom out of) an image or a portion of an image. Again, such processing of MCUs of the image as may be required for rotation or interpolation may be performed with only subsets of the MCUs retrieved, decoded and then processed at a time. Further, such decoding and/or processing of the MCUs may occur entirely within the same storage page into which they stored upon retrieval.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of an embodiment of an image processing system 1000 incorporating one or more of a source device 100, an augmenting device 300 and viewing devices 500 and/or 700. In the image processing system 1000, stream data 130 incorporating image data 131 that represents one or more still images of imagery 880 in compressed form (e.g., compressed into an image bitstream) may be generated by the source device 100. The stream data 130 may then be received from the source device 100 and augmented by the augmenting device 300 with a comment block 332 to generate stream data 330. The augmenting device 300 may store the stream data 330 before transmitting it to one or both of the viewing devices 500 and 700. The stream data 330 may then be decompressed to retrieve the image data 131 and the image data 131 may be visually presented by one or both of the viewing devices 500 and 700. Each of these computing devices may be any of a variety of types of computing device, including without limitation, a desktop computer system, a data entry terminal, a laptop computer, a netbook computer, a tablet computer, a handheld personal data assistant, a smartphone, smart glasses, a smart wristwatch, a digital camera, a body-worn computing device incorporated into clothing, a computing device integrated into a vehicle (e.g., a car, a bicycle, a wheelchair, etc.), a server, a cluster of servers, a server farm, etc.

As depicted, these computing devices 100, 300, 500 and/or 700 exchange signals conveying compressed and/or uncompressed data representing still images of the imagery 880 and/or related data through a network 999. However, one or more of these computing devices may exchange other data entirely unrelated to the imagery 880 with each other and/or with still other computing devices (not shown) via the network 999. In various embodiments, the network 999 may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

In various embodiments, the source device 100 (if present) incorporates an interface 190 to couple the source device 100 to the augmenting device 300 to provide the augmenting device 300 with the stream data 130. As depicted, the interface 190 may couple the source device 100 to the augmenting device 300 through the same network 999 as couples the augmenting device 300 to one or both of the viewing devices 500 and/or 700. However, in other embodiments, the source device 100 may be coupled to the augmenting device 300 in an entirely different manner. At least a portion of the image data 131 of the stream data 130 may have been created via the source device 100, e.g., where the source device 100 incorporates a camera (e.g., the depicted camera 110) such that the image data 131 includes representations of still images of the imagery 880 that were captured by the source device 100. Alternatively or additionally, at least a portion of the stream data 130 that includes the image data 131 may simply be stored on the source device 100 for later conveyance to the augmenting device 300 following its receipt from yet another device.

In various embodiments, the augmenting device 300 incorporates one or more of a processor component 350, a storage 360 and an interface 390 to couple the augmenting device 300 to the network 999. The storage 360 stores one or more of a control routine 340, the stream data 130, the image data 131, the comment block 332 and the stream data 330. The control routine 340 incorporates a sequence of instructions operative on the processor component 350 in its role as a main processor component of the computing device 300 to implement logic to perform various functions.

In executing the control routine 340 in some embodiments, the processor component 350 may receive the stream data 130, including the image data 131 representing still images of the imagery 880, from the source device 100, and may store it in the storage 360. The processor component 350 may then at least partially decompress the stream data 130 to retrieve and decode at least coefficients in the frequency domain of the image data 131 therefrom. In embodiments in which the stream data 130 at least partly conforms to an image compression specification such as a version of JPEG, the image data 131 is compressed by transformation from blocks of pixel color values to blocks of coefficients in the frequency domain, by quantization of the blocks of coefficients, and by entropy encoding to convert the blocks of coefficients into an image bitstream.

Figure 3:
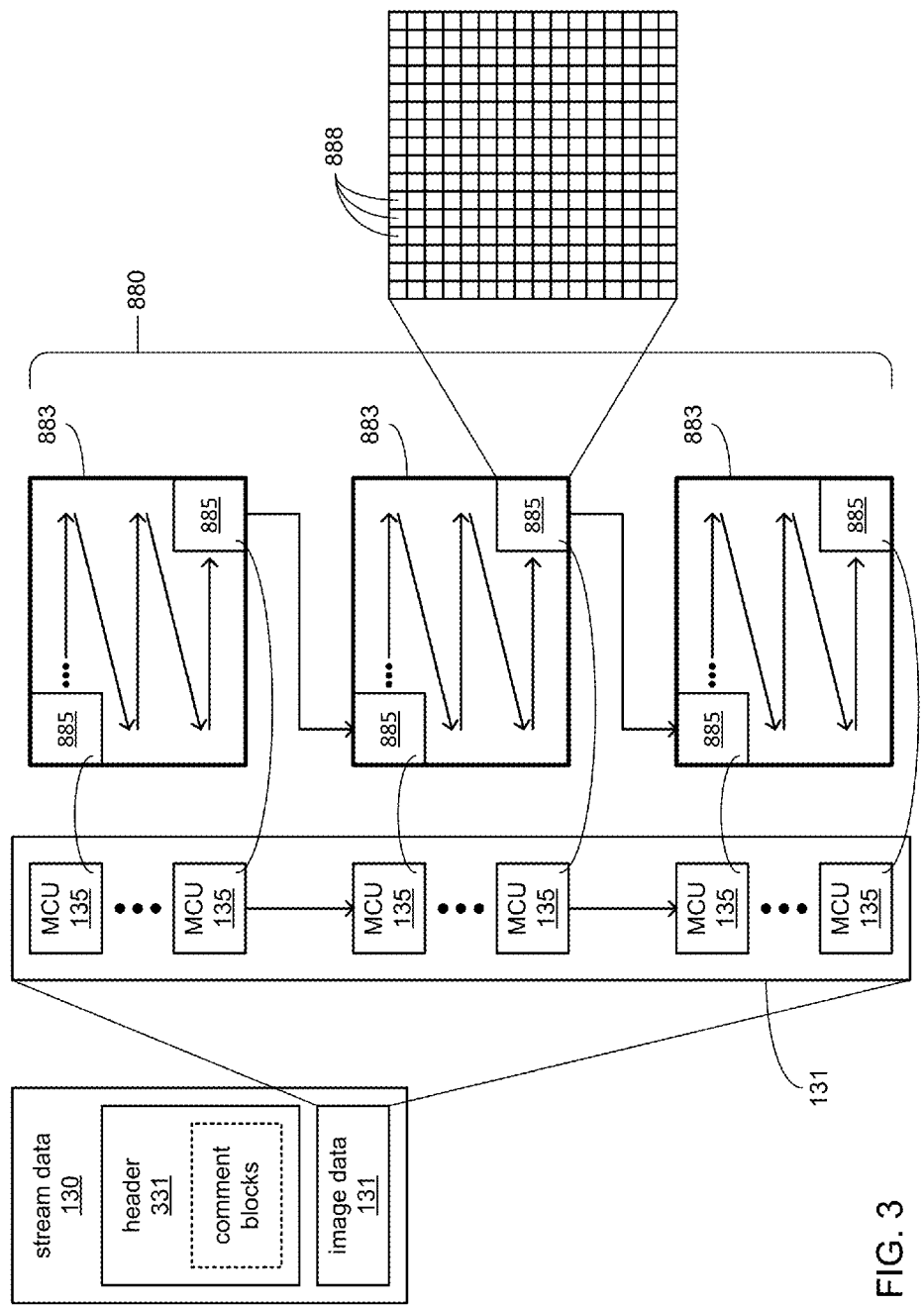
FIGS. 3-4 each illustrate an example of encoding of images in an image bitstream.

FIG. 3 depicts an example of the contents of the stream data 130 in greater detail. As depicted, the stream data 130 includes the image data 131 and a header 331 conveying information concerning the compression of the image data 131 to enable its subsequent decompression. The header 331 may include one or more comment blocks in which data not conveying information required to decompress the image data 131 may be stored, such as notes indicating where or when one or more of the still images 883 of the imagery 880 represented by the image data 131 were captured. Such comment blocks are typically entirely ignored by decompressors employed to decompress JPEG-compliant stream data such as the stream data 130 or 330.

As also depicted, the image data 131 is made up of a series of minimum coded units (MCUs) 135. Each MCU 135 corresponds to a two-dimensional block 885 of pixels 888 of an image 883. The two-dimensional block 885 of pixels 888 to which each MCU 135 corresponds is often 16×16 of the pixels 888 in size, but may be other sizes, including and not limited to 8×8, 8×16, 8×32, 16×32, etc. Each of the MCUs 135 is made up of one or more two-dimensional blocks of coefficients to encode one or more image components (e.g., red, green and blue components, or luminance and chrominance components) of the block 885 of pixels 888 to which the MCU 135 corresponds. More precisely, each MCU 135 describes, in the frequency domain, the pixel color values of a corresponding block 885 of the pixels 888 of one of the images 883 of the image data 131, and may do so with multiple blocks of coefficients for different image components of those pixel color values. The ordering of the MCUs 135 for each of the images 883 is meant to correspond to an order of the blocks 885 of pixels 888 that usually proceeds horizontally left-to-right in horizontal rows of the blocks 885 from the upper left-hand corner to the lower right-hand corner of each image 883, as depicted in FIG. 3.

It should be noted that FIG. 3 (as well as other figures herein) depicts examples of the images 883 in a deliberately simplistic manner to facilitate discussion and understanding, and should not be taken as limiting in terms of size, shape, quantity or other characteristics. More specifically, in FIG. 3 (and later in FIG. 4) the image data 131 is depicted as representing only three of the images 883, all of the same size, and each including only three rows of the blocks 885 of pixels 888 such that only a relatively small quantity of MCUs 135 are needed to represent each of the images 883. Despite this depiction, it should be understood that the image data 131 may represent many more images 883, that those images 883 may each be considerably larger, and/or that each image 883 may be of a different size and/or shape in terms of the number and arrangement of blocks 885 of pixels 888 making up each of them such that the number of MCUs 135 representing each of them may be different.

Figure 4:
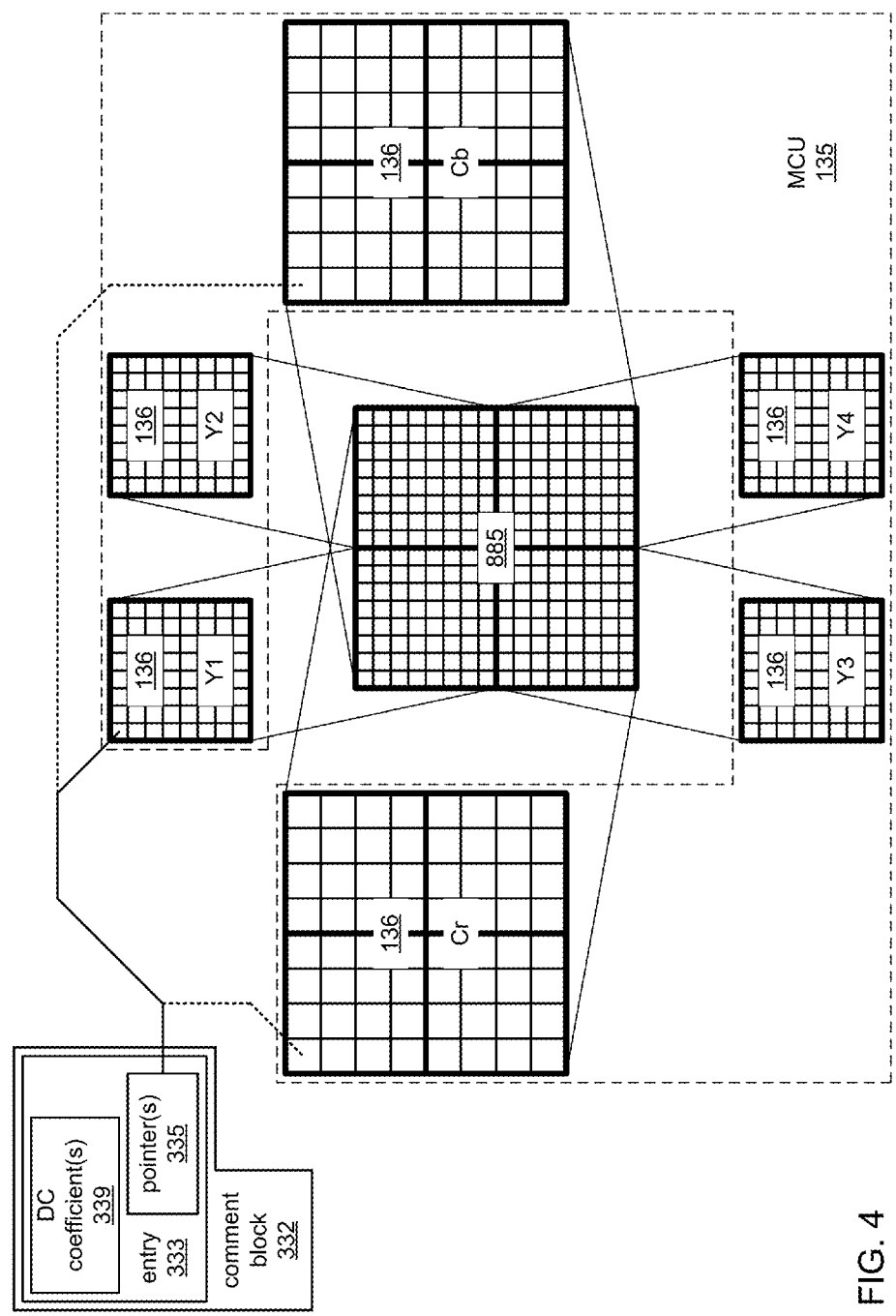

FIG. 4 depicts an example embodiment of a MCU 135 incorporating multiple blocks 136 of coefficients and corresponding to an example embodiment of a block 885 of pixels 888. As familiar to those skilled in the art, the colors of the pixels of an image may be specified in any of a variety of color spaces (e.g., red-green-blue, luminance-chrominance, etc.) in which the values of the components of each color space may be specified in any of a variety of formats. Out of the wide variety of formats that may be used, one of the most common for still images is YUV 4:2:0, in which luminance values (Y) are specified for each pixel, but chrominance values (Cr and Cb) are specified for multiple adjacent pixels. Such a format is at least partially based on known characteristics of the human visual system (HVS) in which detail is perceived more as a result of luminance than as a result of color. Thus, chrominance values for multiple adjacent pixels may be combined (e.g., by averaging, filtering, etc.) and specified with a single value to reduce data size without significant loss of fidelity in an image as perceived by the HVS.

Thus, where YUV 4:2:0 is employed, the luminance of the pixels 888 of the depicted example block 885 of 16×16 of the pixels 888 may be individually specified with separate luminance values, while chrominance values may specify the chrominance for each 2×2 set of four of the pixels 888. Where one of the various versions of JPEG is then used to encode pixel color values specified in this manner, the requirement of JPEG for the DCT transform to be performed on 8×8 sets of pixel color values to generate corresponding 8×8 blocks 136 coefficients can result in each MCU 135 being made up of multiple ones of the blocks 136 of coefficients. More specifically, where a version of JPEG is employed in encoding an image in which each MCU 135 corresponds to a 16×16 block 885 of pixels 888, and where the pixel color values are specified in a luminance-chrominance color space with a YUV 4:2:0 format, each of the MCUs 135 may include four blocks 136 of coefficients for luminance (Y1-Y4) and two blocks 136 of coefficients for chrominance (Cr and Cb). Each of the four blocks 136 of luminance coefficients corresponds to an 8×8 quadrant of the 16×16 block 885 of the pixels 888 represented by the MCU 135. Each of the two blocks 136 of chrominance coefficients corresponds to the entirety of the 16×16 block 885 of the pixels 888 represented by the MCU 135.

Within each of the blocks 136, the coefficients are also usually ordered in a manner in which the first coefficient of each block 136 is the DC coefficient for that block 136 and all of the other coefficients within that block 136 following the DC coefficient are AC coefficients. As stored within the image data 131, the value of the DC coefficient of each block 136 in a MCU 135 is usually indicated as a difference (either positive or negative) from the DC coefficient of a corresponding block 136 of the preceding MCU 135. Thus, for the depicted example MCU 135, the value of the DC coefficient of the block 136 of chrominance coefficients Cr is specified within each MCU 135 as a difference from the value of the DC coefficient of the block 136 of chrominance coefficients Cr of the preceding MCU 135. Similarly, the value of the DC coefficient of the block 136 of chrominance coefficients Cb is specified within each MCU 135 as a difference from the value of the DC coefficient of the block 136 of chrominance coefficients Cb of the preceding MCU 135. Somewhat differently for the blocks 136 of luminance coefficients Y1-Y4, the value of the DC coefficient of the block 136 of luminance coefficients Y1 is specified within each MCU 135 as a difference from the value of the DC coefficient of the block 136 of luminance coefficients Y4 of the preceding MCU 135. This difference arises from there being more than one block 136 of luminance coefficients. The value of the DC coefficient of the block 136 of luminance coefficients Y4 is specified within each MCU 135 as a difference from the value of the DC coefficient of the block 136 of luminance coefficients Y3 of the same MCU 135. Similarly, the values of the DC coefficients of the blocks 136 of luminance coefficients Y3 and Y2 are specified as a difference from the values of the DC coefficients of the blocks 136 of luminance coefficients Y2 and Y1, respectively, of the same MCU 135. Only the values of the DC coefficients for the blocks 136 for all image components of the very first MCU 135 in the image data 131 (which is the first MCU 135 of the first image 883 represented by the image data 131) is specified without reference to other DC coefficient values.

Referring to both FIGS. 1 and 4, in at least partially decompressing the stream data 130, the processor component 350 performs at least entropy decoding on the image data 131 to convert its image bitstream back into the MCUs 135 that were originally entropy encoded during compression to create the image bitstream of the image data 131. In so doing, the processor component 350 tracks the locations in the bitstream of the image data 131 at which the bits representing at least some of the blocks 136 of coefficients of at least some of the MCUs 135 begin. The processor component 350 generates the comment block 332 with entries therein for those MCUs 135, indicating in each of the entries the locations of at least one of those blocks 136 in that bitstream and including indications of values of DC coefficients.

FIG. 4 depicts an example embodiment of an entry 333 of the comment block 332 that incorporates at least one pointer 335 indicating the location of the first coefficients (the DC coefficients) of the block 136 of the luminance coefficients Y1. This depiction is in recognition of the common practice of organizing the blocks 136 of coefficients within each MCU 135 in a single ordering that enables all of the blocks 135 of coefficients within each MCU 135 to found once the location of one of them is known. However, as also depicted, there may still be other pointers 135 that may provide separate indications of the location of the first coefficients of the blocks 136 of the chrominance coefficients Cr and Cb. In some embodiments, it may be deemed desirable, even if not necessary, to have such multiple pointers to better enable parallel decoding of the blocks 136 of coefficients of each of the image components (e.g., parallel decoding of the coefficients for Y, Cr and Cb).

The example entry 333 also incorporates multiple DC coefficients 339 specifying the values of the DC coefficients of at least the blocks 136 of chrominance coefficients Cr and Cb and the block 136 of luminance coefficients Y1 in a standalone manner without reference to any other coefficient. The processor component 350 may then augment the header 331 of the stream data 130 with the comment block 332, thereby generating the stream data 330 to include the image data 131 and the header 331 as now augmented to include the comment block 332.

Figure 5:
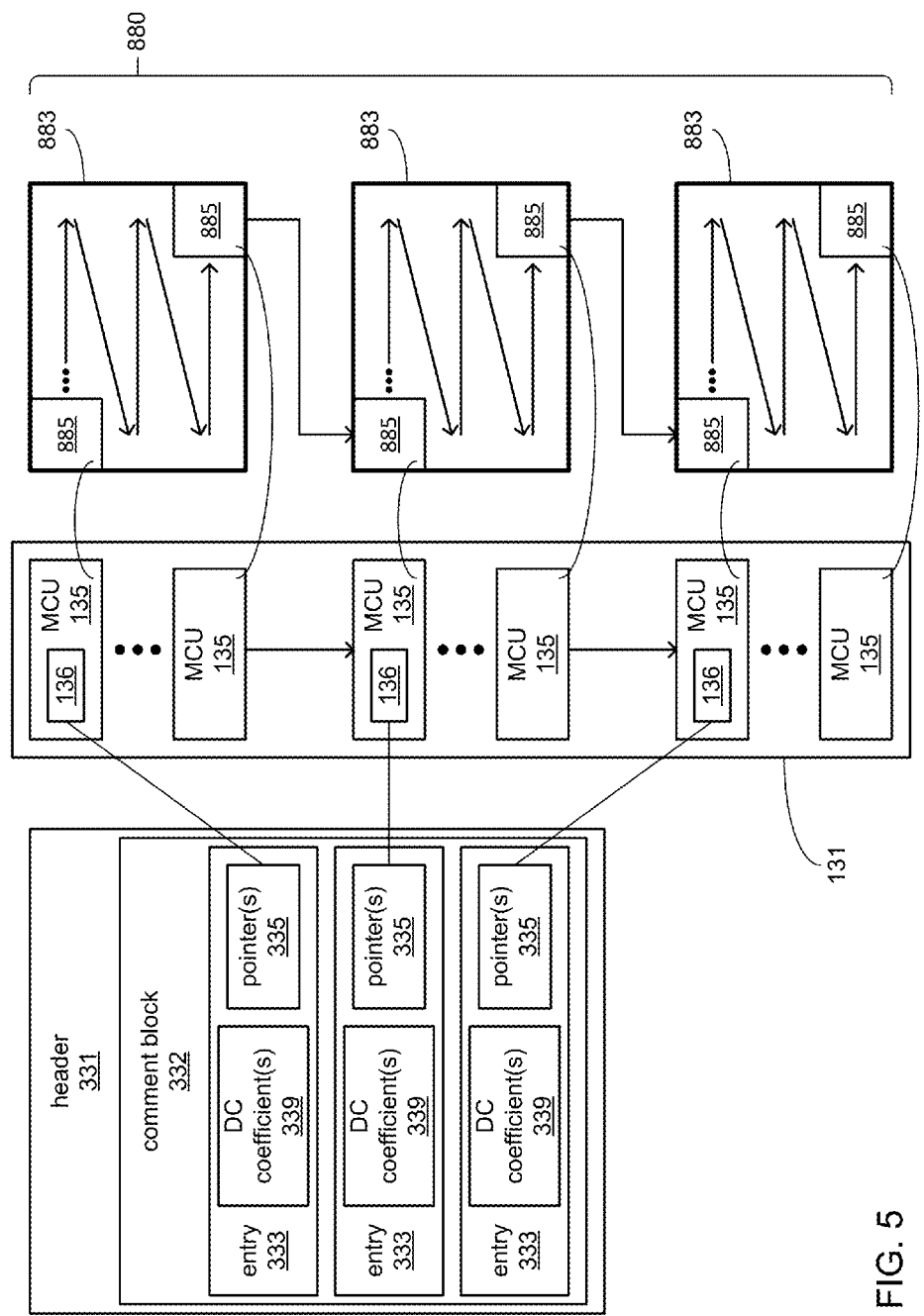
FIGS. 5-6 each illustrate an embodiment of augmenting the image bitstream of FIG. 3.

FIG. 5 depicts an example embodiment of the comment block 332 in which multiple entries 333 are depicted that correspond to the first MCU 135 of each of the images 883 represented by the image data 131. More precisely, the corresponding MCU 135 of each of the entries 333 is the MCU 135 that corresponds to the first block 885 of pixels 888 of one of the images 883 (e.g., the one of the blocks 885 at the upper left-hand corner of an image 883). Again, each of the entries 333 includes one or more pointers 335 to the location(s) at which each of the one or more blocks of coefficients within the corresponding MCU 135 begins in the bitstream of the image data 131. Each of the entries 333 also includes indications 339 of the value of the DC coefficient(s) of the one or more blocks 136 of coefficients of the corresponding MCU 135 in which each of the indications 339 specifies a DC coefficient value without reference to any other DC coefficient.

Figure 6:
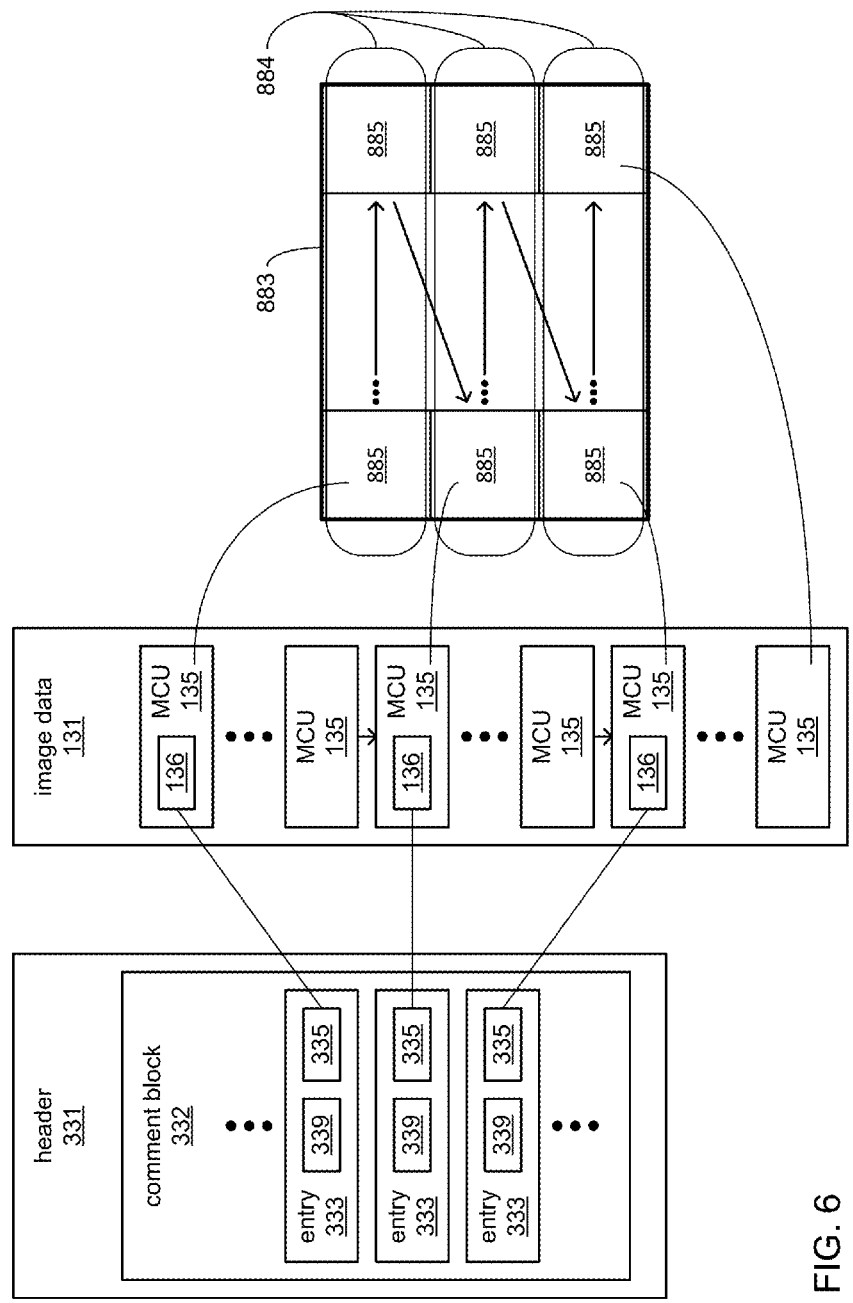

FIG. 6 depicts an example embodiment of the comment block 332 in which the entries 333 are generated to correspond to the first MCU 135 of each horizontal row 884 of blocks 885 of the images 883 represented by the image data 131. More precisely, unlike the embodiment of the comment block 332 of FIG. 5, in the embodiment of the comment block 332 of FIG. 6, the corresponding MCU 135 of each of the entries 333 is the MCU 135 that corresponds to the first block 885 of pixels 888 in a horizontal row 884 of blocks 885 of an image 883 (e.g., the one of the blocks 885 at the left-most position of one of the rows 884 of an image 883).

Though not specifically depicted, in still another embodiment of the comment block 332, every MCU 135 of each of the images 883 may have a corresponding entry 333 in the comment block 332. In yet another embodiment of the comment block 332, each entry 333 may correspond to a portion of one of the horizontal rows 884 of blocks 885 of each of the images 883 or to a set of MCUs 135 that are each of an arbitrarily selected quantity of MCUs 135 (e.g., 5 or 10 MCUs per set).

Returning to FIG. 1, after generating the stream data 330 to include the comment block 332, the processor component 350 may operate the interface 390 to transmit the stream data 330 via the network 999 to one or both of the viewing devices 500 and 700. The processor component 350 may provide the stream data 330 to such viewing devices, either through the network 999 or via a different mechanism, in response to a request received for the stream data 330 and/or in a broadcast to multiple other devices.

In various embodiments, the viewing device 500 (if present) incorporates one or more of a processor component 550, a storage 560, an input device 520, a display 580 and an interface 590 to couple the viewing device 500 to the network 999. The storage 560 stores a control routine 540, the stream data 330 and the image data 131 retrieved from the stream data 330. The control routine 540 incorporates a sequence of instructions operative on the processor component 550 in its role as a main processor component of the viewing device 500 to implement logic to perform various functions.

In executing the control routine 540 in some embodiments, the processor component 550 may receive the stream data 330 from the augmenting device 300, may decompress at least the image data 131 thereof, and may visually present one or more of the still images 883 of the imagery 880 on the display 580. In so doing, the processor component 550, in executing the control routine 540, may entirely ignore the comment block 332 within the stream data 330. Thus, where the input device 520 may be operated by an operator of the viewing device 500 to specify a particular one of the images 883 to be viewed, the processor component 550 may sequentially retrieve and decode the images 883 of the image data 131 until the particular one of the images 883 is reached. The processor component 550 may then retrieve and decode that particular one of the images 883 and visually present it on the display 580.

In various embodiments, the viewing device 700 (if present) incorporates one or more of a processor component 750, a storage 760, an input device 720, a display 780 and an interface 790 to couple the viewing device 700 to the network 999. The storage 760 stores a control routine 740, the stream data 330, and the comment block 332 and the image data 131 retrieved from the stream data 330. The control routine 740 incorporates a sequence of instructions operative on the processor component 750 in its role as a main processor component of the viewing device 700 to implement logic to perform various functions.

In executing the control routine 740 in some embodiments, the processor component 750 may receive the stream data 330 from the augmenting device 300, may decompress at least the image data 131 thereof, and may visually present one or more of the still images 883 of the imagery 880 on the display 780. However, unlike the processor component 550 executing the control routine 540 in the viewing device 500, the processor component 750 retrieves and employs the pointer(s) 335 of one or more of the entries 333 of the comment block 332 to determine the locations within the image data 131 at which one or more desired images are located.

Thus, where the input device 720 may be operated by an operator of the viewing device 700 to specify a particular one of the images 883 to be viewed, the processor component 750 may first parse the entries 333 of the comment block 332 to locate at least one entry 333 corresponding to that particular image 883. In embodiments in which the comment block 332 has been entropy encoded to reduce its size, the processor component 750 may first perform entropy decoding on the comment block 332 to reverse such entropy encoding prior to parsing the entries 333.

In embodiments in which the entirety of the particular image 883 is to be viewed and there is a single entry 333 within the comment block 332 for each image 883, the processor component 750 employs the pointer(s) 335 of the one entry 333 corresponding to the particular image 883 to retrieve all of the MCUs 135 of that particular image 883. Again, at least one pointer 335 of that single entry 333 for the particular image points to the first coefficient of at least one block 136 of coefficients of the first MCU 135 corresponding to the first block 885 of the particular image 883, and the retrieval of the MCUs 135 of the particular image 883 begins with that first MCU 135. Indeed, the retrieval of the MCUs 135 of the particular image 883 may begin with the first MCU 135 corresponding to the block 885 positioned in the upper left-hand corner, and proceeding through the MCUs 135 in a manner corresponding to going left-to-right through horizontal rows 884 of the blocks 885 of the particular image 883 until the MCU 135 corresponding to the last block 885 at the lower right-hand corner of the image 883 is reached. The processor component 750 also employs the indication(s) 339 of the value(s) of DC coefficient(s) of one or more blocks 136 of coefficients of that first MCU 135 to begin the decoding of the retrieved MCUs 135, starting with that first MCU 135.

In this way, compared to the viewing of a particular image 883 as performed by the viewing device 500, a considerable savings in processing and/or storage resources is realized by the viewing device 700 by employing the information of an entry 333 of the comment block 332 to avoid having to sequentially access and decode all of the images 883 from the beginning of the image data 131 up to where the particular image 883 is located in the image data 131. Correspondingly, a considerable amount of power (e.g., electric power stored in a battery of the viewing device 700) is also conserved.

In embodiments in which only a portion of the particular image 883 is to be viewed and there is a single entry 333 within the comment block 332 for each image 883, the processor component 750 again employs the pointer(s) 335 of the one entry 333 corresponding to the particular image 883 to begin retrieving MCUs 135 of that particular image. Again, the retrieval may begin with the first MCU 135, which may correspond to the block 885 at the upper left-hand corner, and may then proceed left-to-right horizontally through rows 884 of the blocks 885 as just described above. However, as ones of the MCUs 135 are retrieved and decoded (also starting with the first MCU 135), each of the MCUs 135 that do not correspond to the portion of the particular image that is to be viewed is discarded once its DC coefficient(s) have been calculated to enable calculation of the DC coefficient(s) of the next MCU 135. Also, once the last one of the MCUs 135 that does correspond to the portion of the particular image 883 has been retrieved, the processor component 750 ceases retrieving any more MCUs 135 of the particular image 883.

As will be explained in greater detail, the storage 760 may be made up of multiple storage devices, including one or more storage devices based on a storage technology that is deemed "volatile" due to its reliance on a substantially uninterrupted supply of electricity to maintain whatever is stored therein. Such technologies include various forms of dynamic random access memory (DRAM) that may impose other operational requirements or restrictions such as a relatively limited storage page size (e.g., four kilobytes) that may arise due to the manner in which storage cells are organized into rows, columns, etc. The imposition of such a page size limitation may become significant where the technology employed imposes a delay in accesses to storage cells where a first access is directed to one or more storage cells within one page and a second access immediately following the first is directed to one or more storage cells within another page. Such a delay may become a substantial hindrance in processing image data where the data retrieved of the image is of sufficient size as to fill more than one of such pages (thereby being said to "cross" one or more page boundaries). In addition to such delays, each crossing of a page boundary may result in the page now being accessed having to be made ready for being accessed (sometimes referred to as "opening" the page), which may require additional consumption of power.

Despite the possible imposition of such page-based delays and/or increases in power consumption, the inclusion of such storage devices based on such volatile storage technologies is often seen as desirable due to their access speeds often being considerably greater than can be achieved with storage devices based on non-volatile storage technologies, even with delays imposed by crossing page boundaries. However, in portable computing devices, especially those employing power sources of limited capacity (e.g., batteries), the fact that storage devices based on a volatile storage technology continuous require a supply of electricity places a considerable power resource requirement on what power source is used. Thus, the proportion of the storage 760 of the viewing device 700 employing a volatile memory technology may be limited in an effort to conserve electric power. Thus, the storage 760 may include a portion that is volatile storage 761 made up of one or more storage devices employing a volatile storage technology, and which may make up a relatively small proportion of the storage 760.

The ability to avoid retrieving and decoding numerous unwanted images 883 as part of retrieving and decoding a single particular image 883 removes the impetus to allocate a sizeable portion of the storage 760 to attempt to quickly work through the retrieval and decoding of those unwanted images 883. Instead, it becomes reasonable to devote a smaller portion of the storage 760 to support the retrieval and decoding of portions of a particular image 883 that is desired to be retrieved and decoded for being visually presented. Thus, in an effort to balance speed of image processing with conservation of electric power, the retrieval of a particular image 883 for being viewed (as in either of the above examples of the processor component 750 retrieving either all or a portion of a particular image 883) may entail the processor component 750 retrieving and decoding only a limited quantity of the MCUs 135 of that particular image 883 at a time. That limited quantity may be calculated to fill a relatively small number of storage pages of the volatile storage 761 at any given time to minimize encountering delays due to crossing page boundaries, or indeed, may be calculated to fill only one storage page of the volatile storage 761 in an effort to entirely avoid such delays. As decoding is completed for each limited quantity of the MCUs 135, the pixel color values derived from such decoding may be stored within the display buffer 786 from which those pixel color values may be recurringly accessed as part of raster scanning the particular image 883 onto the display 780, thereby enabling each limited quantity of the MCUs 135 to be replaced with the next such limited quantity.

Figure 7:
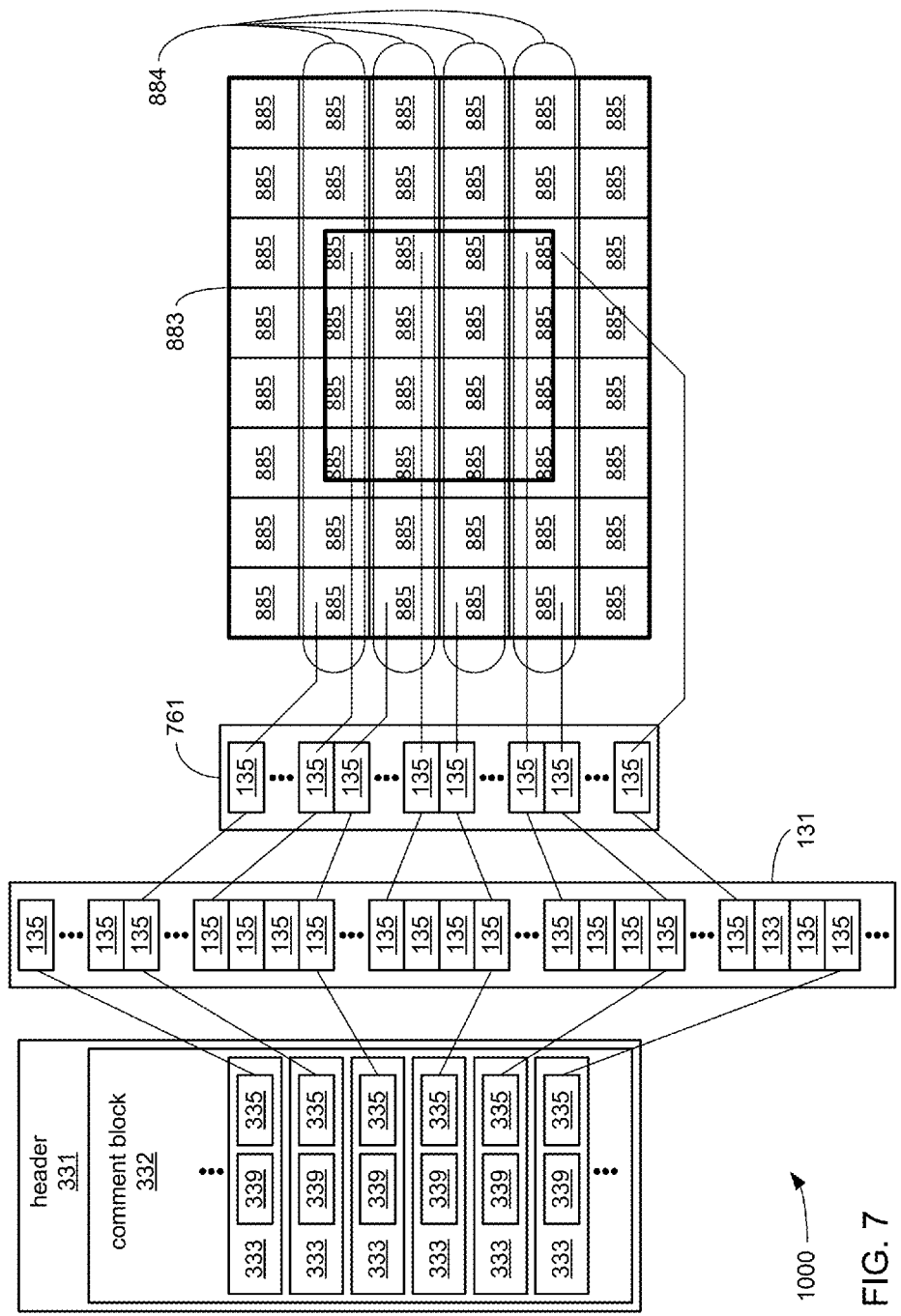
FIG. 7 illustrates an embodiment of retrieving a portion of an image.

FIG. 7 depicts an embodiment in which only a portion of the particular image 883 is to be viewed and there is an entry 333 within the comment block 332 for each horizontal row 884 of the image 883. In such an embodiment, the processor component 750, in executing the control routine 740, parses the comment block 332 for the one or more entries 333 that correspond to the rows 884 that include the blocks 885 that correspond to the portion of the image 883 that is to be viewed. Thus, the processor component 750 may employ the entries 333 of the comment block 332 to not only skip over entire unwanted images 883, but to also skip over unwanted rows 884 of the particular image 883 of which a portion is to be viewed. For each of the rows 884 having at least one block 885 that corresponds with the portion to be viewed, retrieval of MCUs 135 may begin with the first MCU 135 of the row 884, which may correspond to the block 885 at the left-most end of the row 884, and may then proceed left-to-right horizontally through the row 884 until the right-most block 885 of the row that corresponds to the portion to be viewed has been reached. In each of these rows 884, as ones of the MCUs 135 are retrieved and decoded (also starting with the first MCU 135 of each of these rows), each of the MCUs 135 that do not correspond to the portion of the particular image that is to be viewed is discarded once its DC coefficient(s) have been calculated to enable calculation of the DC coefficient(s) of the next MCU 135.

In embodiments in which the entirety of a particular image 883 is to be viewed and there is an entry 333 within the comment block 332 for each horizontal row 884 of the image 883, the processor component 750 again parses the comment block 332 for the all of the entries 333 that correspond to the rows 884 of the particular image 883. For each of the rows 884 of the particular image 883, retrieval of MCUs 135 may begin with the first MCU 135 of the row 884, which may correspond to the block 885 at the left-most end of the row 884, and may then proceed left-to-right horizontally throughout the row 884. The MCUs 135 of each of the rows is decoded, also starting with the first MCU 135 of each of the rows, and employing the indications(s) 339 of the value(s) of the DC coefficient(s) of one or more blocks 136 of coefficients of that first MCU 135 in each of the rows.

As also depicted in FIG. 7, the retrieval of MCUs 135 may entail their storage and/or decoding within the volatile storage 761. As previously discussed, it may be desired to retrieve and decode only subsets of the MCUs 135 being retrieved at any given time to enable all of the retrieved and decoded MCUs 135 to fit within either a single storage page or a relatively small quantity of storage pages of the volatile storage 761 to avoid or minimize delays arising from crossing page boundaries. Following retrieval of subsets of MCUs 135 in the storage and their decoding to convert the coefficients of block(s) 136 of the MCUs 135 back into pixel color values, those derived pixel color values may be manipulated within the same storage page(s) to accomplish rotation and/or interpolation of the image 883 to which they belong.

Figure 8:
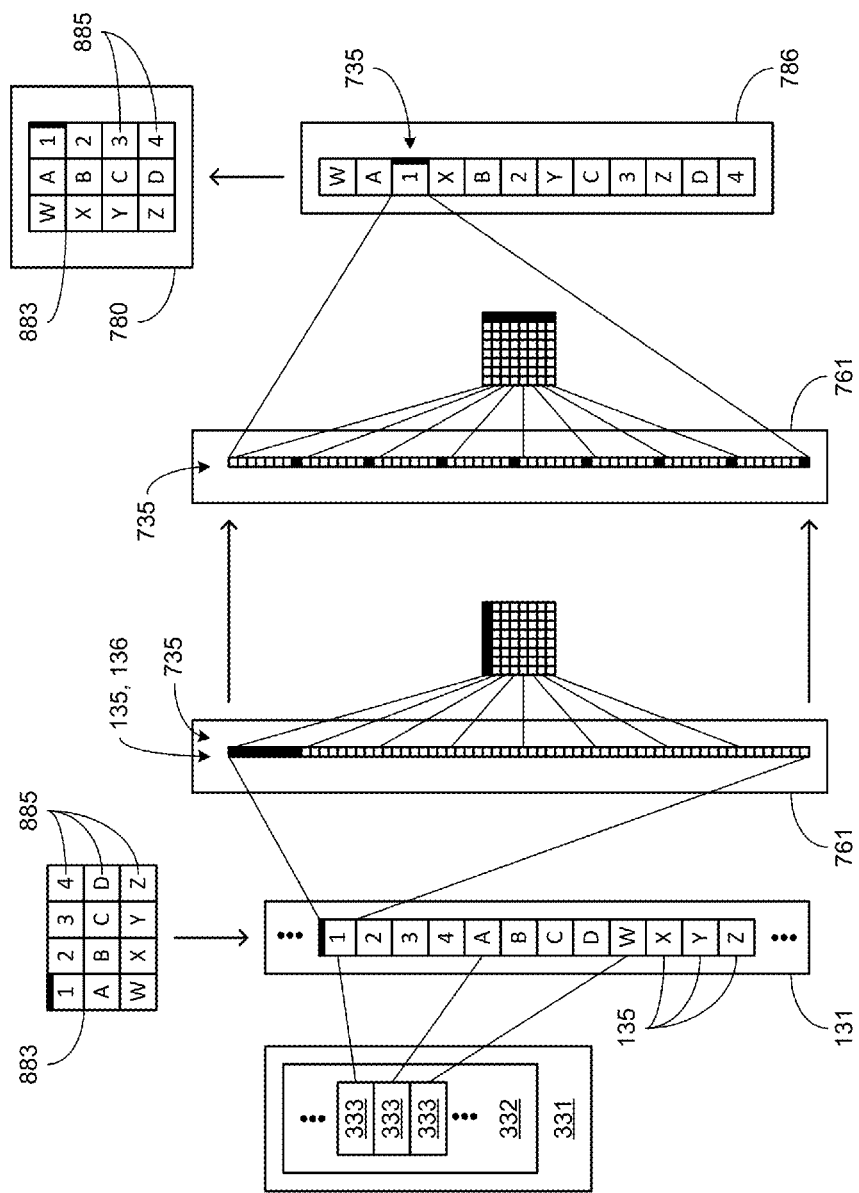
FIG. 8 illustrates an embodiment of rotating a portion of an image.

FIG. 8 depicts an example embodiment of rotation of an example block 885 of pixels 888 associated with a single MCU 135 of an image 883 in greater detail. For sake of visual clarity and simplicity, the block 885 in this depicted example is 8×8 pixels in size (though a block of pixels corresponding to a MCUs are more commonly 16×16 pixels in size), and the MCU 135 in this depicted example incorporates only a single 8×8 block 136 of coefficients (though as discussed earlier, MCUs more commonly include multiple blocks of coefficients). As depicted, a relatively small image (only 3×4 blocks 885 in size) is to be rotated clockwise from a "landscape" orientation to a "portrait" orientation in preparation for being visually presented on the display 780. It should be noted that the depicted twelve blocks 885 have been labeled with various characters to enable the resulting repositioning of the blocks 885, both geometrically and in the order in which they are stored, to be more easily followed and understood. It is not the case that these various characters are actually part of the depicted image 883. It should be further noted that a 1×8 row of pixels 888 of the 8×8 block of pixels 885 labeled with the character "1" has been darkened to enable the resulting repositioning of those particular pixels 888, both geometrically and in the order in which they are stored, to also be followed and understood.

As depicted, the processor component 750, in executing the control routine 740, has employed an entry 333 of the comment block 332 to retrieve from the image data 131 a MCU 135 corresponding to the block 885 labeled with the character "1" and of which eight of the pixels 888 have been darkened. Upon retrieving this MCU 135, the coefficients of its single block 136 of coefficients are stored within the volatile storage 761 in a manner corresponding to an order that begins at the upper left-hand corner and proceeds horizontally across horizontal rows to the lower right-hand corner of that single block 136. As has been discussed, the MCU 135 (and therefore, its single block 136 of coefficients) may be stored within a single storage page of the volatile storage 761 to at least minimize instances of crossing a page boundary as the processor component 750 performs various operations on it.

At least initially, having stored the MCU 135 within the volatile storage 761, the processor component 750 decodes the MCU 135 to convert its single block 136 of coefficients into a corresponding set 735 of pixel color values. In so doing, the processor component 750 may employ entropy decoding, inverse quantization and an inverse DCT to reverse the forward DCT, quantization and entropy encoding originally performed to convert pixel color values into the 8×8 set of coefficients of the MCU 135. Following such decoding, the set of pixel color values 735 is organized in an order corresponding to the order in which the coefficient values were originally stored in the volatile storage 761. In some embodiments, such decoding may be carried out on the coefficients of the MCU 135 in place within the volatile storage 761 such that the resulting set 735 of pixel color values at least partially overwrites the coefficients of the MCU 135 within the volatile storage 761, thereby reusing the same storage locations and aiding in minimizing the overall amount of space used within the volatile storage 761.

However, as part of rotating the image 883, the processor component rotates the pixel color values of each set 735 of pixel color values corresponding to each of the MCUs 135 of the image 883. Thus, the order of the set 735 of pixel color values following decoding is changed by the processor component 750. As familiar to those skilled in the art of representing pixel maps in storage, such a rotation of a two-dimensional array of pixels in storage changes their relative locality in the address space of that storage. As shown, the pixel color values of the eight darkened pixels 888 cease being located at contiguously addressable storage locations within the volatile storage 761, and are re-located to addressable storage locations now separated by storage locations of others of the pixel color values.

Following such rotation of pixel color values within the set 735, the processor component 750 then effectively rotates the blocks 885 of the image 883 relative to each other by copying the set 735 of pixel color values to a set of locations within the display buffer 786 that corresponds to where the block 885 of pixels 888 corresponding to the set 735 is to be visually presented on the display 780 as a result of the rotation of the image 883. The processor 750 then repeats the same operations with each of the other eleven MCUs 135 that correspond with the other blocks 885 of the image 883. This enables rotations of images with minimal memory usage, as only MCUs 135 of the image 883 to be rotated are retrieved and decoded, and thus, may fit within a single storage page or limited quantity of storage pages to minimize instances of crossing page boundaries.

Figure 2:
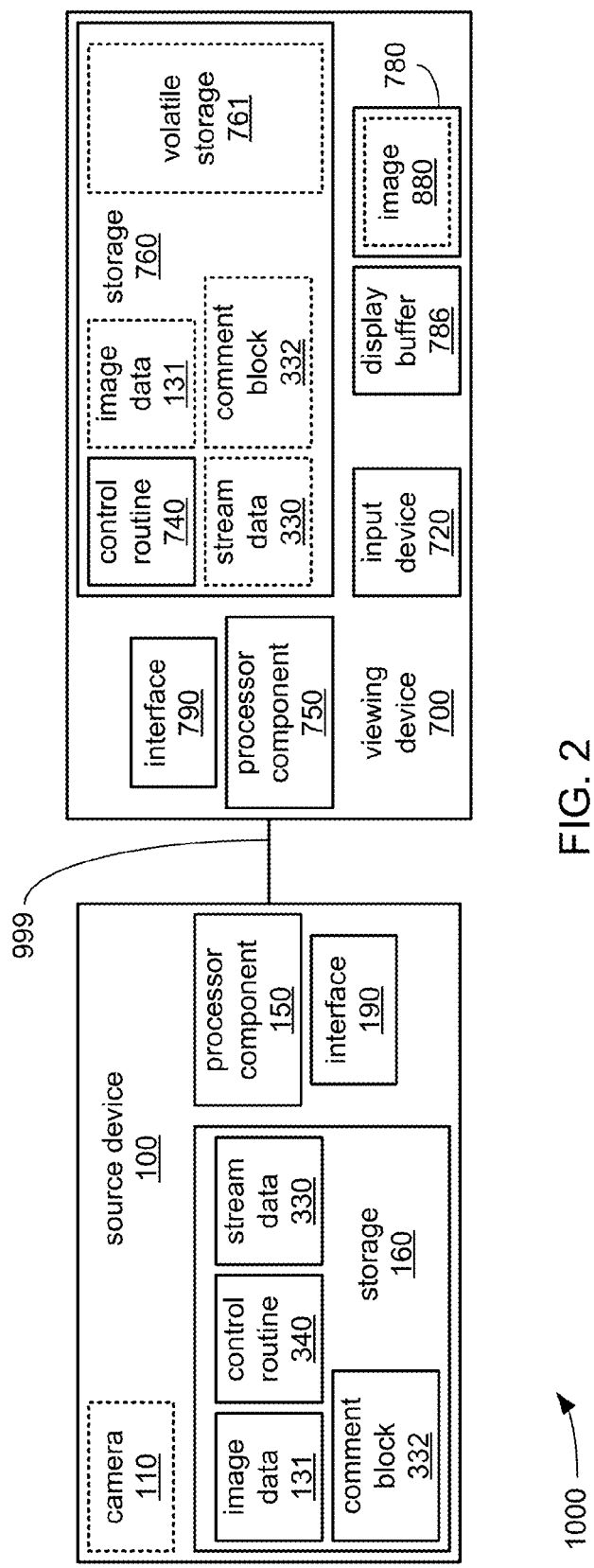
FIG. 2 illustrates an alternate embodiment of an image processing system.

FIG. 2 illustrates a block diagram of an alternate embodiment of the image processing system 1000 that includes an alternate embodiment of the source device 100. The alternate embodiment of the image processing system 1000 of FIG. 2 is similar to the embodiment of FIG. 1 in many ways, and thus, like reference numerals are used to refer to like elements throughout. However, unlike the source device 100 of FIG. 1, the source device 100 of FIG. 2 generates and includes the comment block 332 in the stream data 330 as it generates the stream data 330 based on the image data 131. Thus, unlike the source device 100 of FIG. 1, which did not generate the comment block 332 at all such that the stream data 130 had to be augmented to include it (thereby creating the new stream data 330), the source device 100 of FIG. 2 does so. Therefore, in the alternate embodiment of the image processing system 1000 of FIG. 2, the augmenting device 300 is not included as its function is rendered unnecessary.

In various embodiments, each of the processor components 350, 550 and 750 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are in some way linked.

Although each of the processor components 350, 550 and 750 may include any of a variety of types of processor, it is envisioned that the processor component 450 of the controller 400 (if present) may be somewhat specialized and/or optimized to perform tasks related to graphics and/or video. More broadly, it is envisioned that the controller 400 embodies a graphics subsystem of the computing device 300 to enable the performance of tasks related to graphics rendering, video compression, image rescaling, etc., using components separate and distinct from the processor component 350 and its more closely related components.

In various embodiments, each of the storages 360, 560 and 760 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the interfaces 190, 390, 590 and 790 may employ any of a wide variety of signaling technologies enabling these computing devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 9:
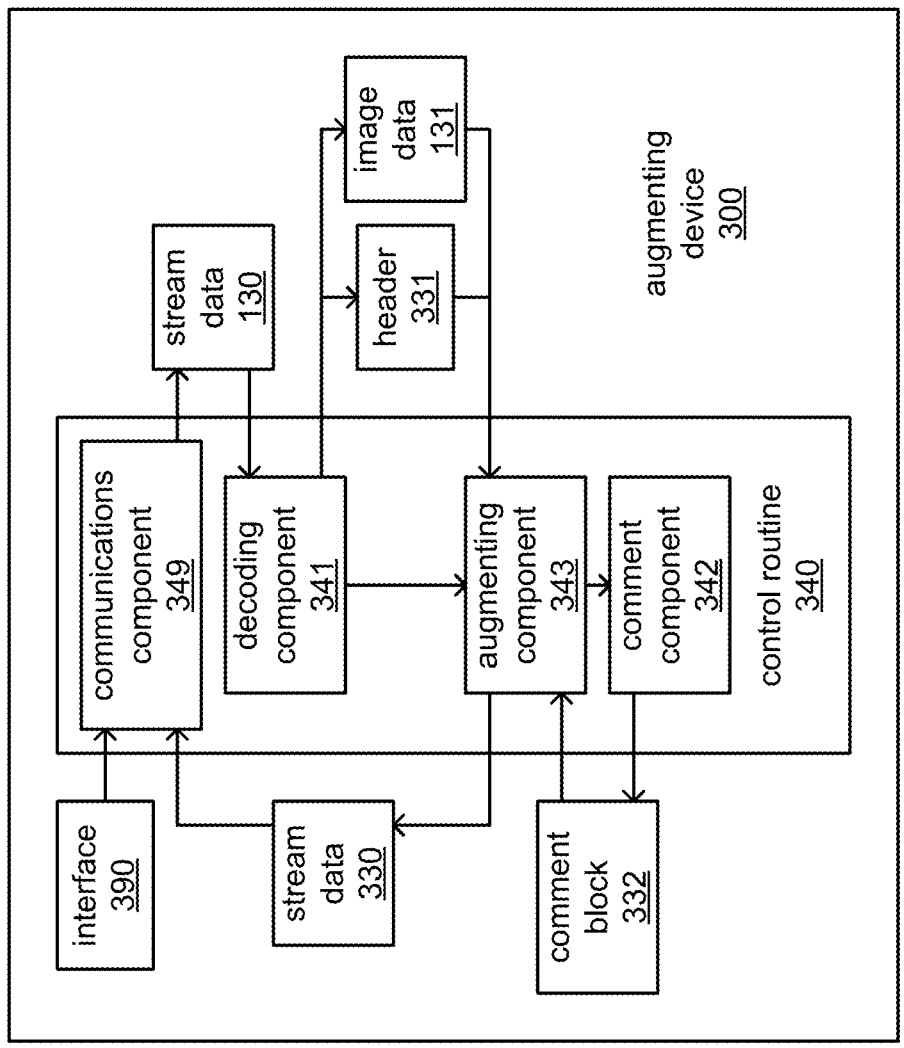
FIGS. 9-10 each illustrate a portion of an embodiment.
Figure 10:
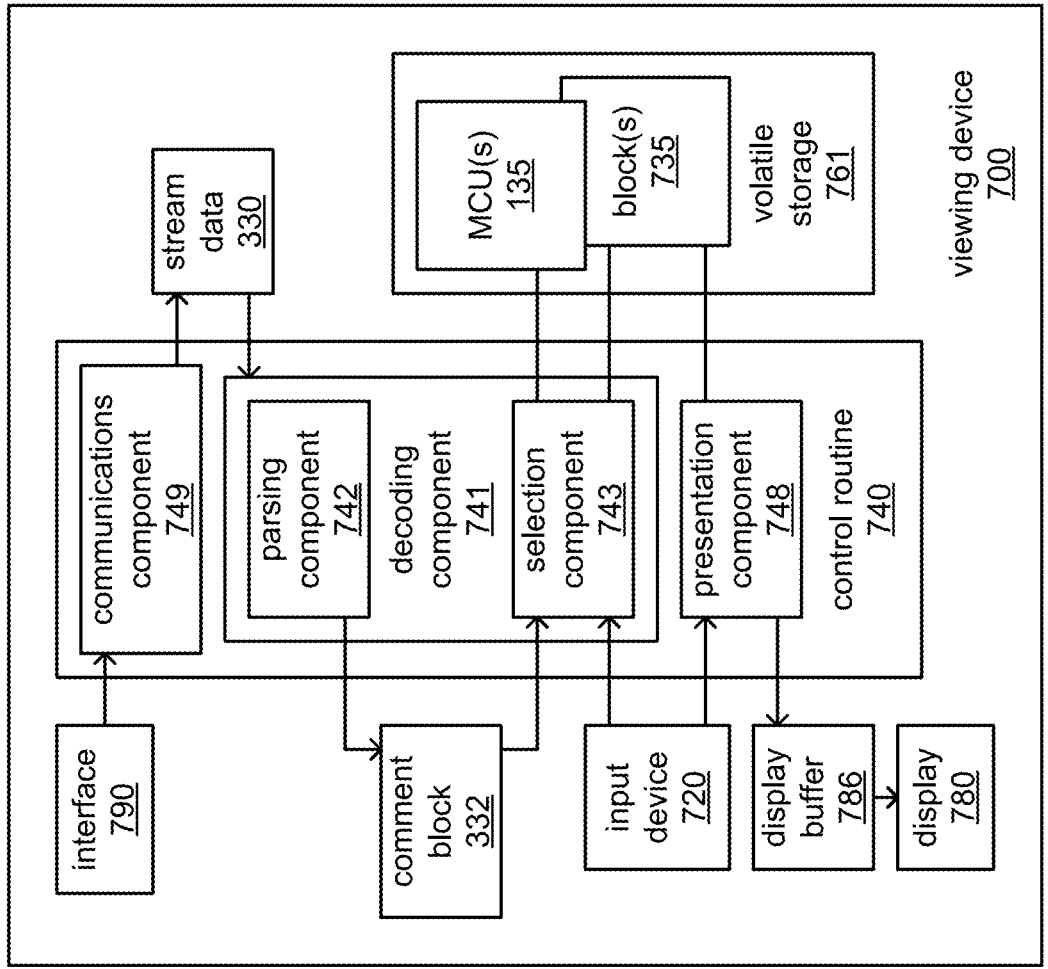

FIGS. 9 and 10 each illustrate a block diagram of a portion of an embodiment of the image processing system 1000 of either FIG. 1 or FIG. 2 in greater detail. More specifically, FIG. 9 depicts aspects of the operating environment of the augmenting device 300 in which the processor components 350, in executing the control routine 340, generates the comment block 332 and augments the stream data 130 with it to thereby generate the newer stream data 330. FIG. 10 depicts aspects of the operating environment of the viewing device 700 in which the processor component 750, in executing the control routine 740, partially decompresses the data stream 330 to retrieve and decode one or more still images 883 of the imagery 880 to visually present on the display 780. As recognizable to those skilled in the art, the control routines 340 and 740, including the components of which each is composed, are selected to be operative on whatever type of processor or processors that are selected to implement applicable ones of the processor components 350 and 750.

In various embodiments, each of the control routines 340 and 740 may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor components 350 and 750. Where one or more device drivers are included, those device drivers may provide support for any of a variety of other components, whether hardware or software components, of corresponding ones of the computing devices 300 and 700.

The control routines 340 or 740 may include a communications component 349 or 749, respectively, executable by applicable ones of the processor components 350 or 750 to operate corresponding ones of the interfaces 390 or 790 to transmit and receive signals via the network 999 as has been described. Among the signals received may be signals conveying the stream data 130 and/or 330 among one or more of the computing devices 100, 300, 500 or 700 via the network 999. As will be recognized by those skilled in the art, each of these communications components is selected to be operable with whatever type of interface technology is selected to implement corresponding ones of the interfaces 390 or 790.

Turning more specifically to FIG. 9, the control routine 340 may include a decoding component 341 executable by the processor component 350 to perform at least entropy decoding on the image data 131 of the received stream data 130 to reverse the entropy encoding earlier used to generate the image bitstream of the image data 131. As the processor component 350 performs this entropy decoding, the processor component 350 tracks the locations in that image bitstream at which at least some of the blocks 136 of coefficients of at least some of the MCUs 135 (e.g., the ones of the MCUs 135 corresponding to the first block 885 of an image 883 and/or to the first block 885 of each horizontal row of blocks 885 of an image 883).

The control routine 340 may include a comment component 342 executable by the processor component 350 to employ information about locations at which at least some blocks 136 of coefficients of at least some MCUs 135 start in the image bitstream decoded by the decoding component 341 to generate the entries 333 of the comment block 332. The comment component 342 may also receive indications of values of DC coefficients of those same blocks 136 of coefficients of those same MCUs 135 to include in the generated entries 333.

The control routine 340 may include an augmenting component 343 executable by the processor component 350 to generate the stream data 330 from portions of the steam data 130 as augmented by the comment block 332. More specifically, the augmenting component may add the comment block 332 to the header 331, and then generate the stream data 330 from the now augmented header 331 and the image data 131.

Turning more specifically to FIG. 10, the control routine 740 may include a decoding component 741 executable by the processor component 750 to decompress the stream data 330 to retrieve one or more particular ones of the images 883 from the stream data 330 for being visually presented on the display 780. The decoding component 741 may include a parsing component 742 to parse the comment block 332 of the stream data 330 to locate one or more entries 333 indicating the locations at which one or more blocks 136 of coefficients of one or more MCUs 135 associated with the one or more particular images 883 start in the image bitstream of the image data 131. In embodiments in which the comment block is entropy encoded, the decoding component 741 may perform entropy decoding on the comment block 332 to reverse its entropy encoding to enable the parsing component to parse its entries 333.

The decoding component 741 may also include a selection component to act on the information of the entries 333 located by the parsing component 742 to select ones of the MCUs 135 to retrieve for decoding by the decoding component 741 in preparation for visually presenting the one or more particular images on the display 780. The selection component 743 may monitor the input device 720 for indications of what images 883 are the next ones selected to be visually presented. In performing such selective retrieval of the MCUs 135, the selection component 743 may store subsets of the selected MCUs 135 of limited quantities in the volatile storage 761 where the decoding component 741 may decode them, thereby deriving the blocks 735 of pixel color values. As has been discussed, amidst so deriving the blocks 735, the pixel color values thereof may at least partially overwrite at least a portion of the one or more blocks 136 of coefficients of the MCUs 135 from which they were derived.

The control routine 740 may include a presentation component 748 executable by the processor component 750 to operate the display 780 to visually present the one or more particular images 883. The presentation component 748 may retrieve the blocks 735 from the volatile storage 761 and copy their pixel color values into the display buffer 786 to effect their visual presentation. In some embodiments, the presentation component 748 may monitor the input device 720 for indications of the input device 720 being operated to convey one or more commands to rotate and/or interpolate (e.g., zoom into and/or zoom out of) one of the images 883. To effect such rotation and/or interpolation, the presentation component 748 may manipulate the pixel color values and/or the relative positions of the pixel color values of one or more of the blocks 735 in place within the volatile storage 761.

Figure 11:
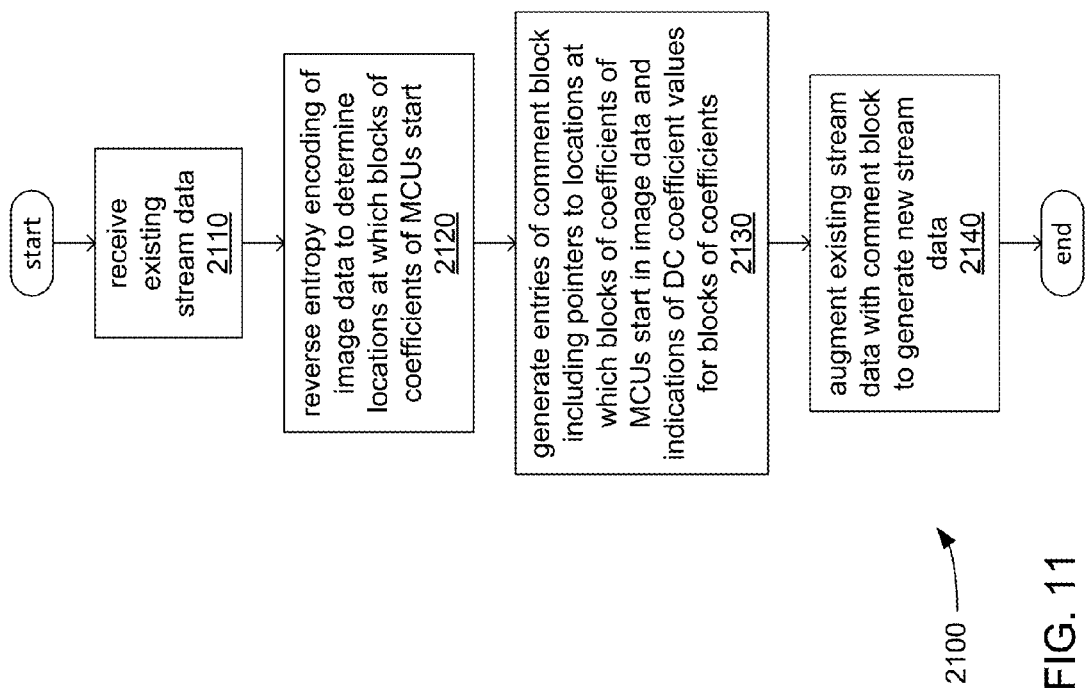
FIGS. 11-12 each illustrate a logic flow according to an embodiment.

FIG. 11 illustrates one embodiment of a logic flow 2100. The logic flow 2100 may be representative of some or all of the operations executed by one or more embodiments described herein. More specifically, the logic flow 2100 may illustrate operations performed by the processor component 350 in executing at least the control routine 340, and/or performed by other component(s) of the augmenting device 300.

At 2110, a processor component of an augmenting device of an image processing system (e.g., the processor component 350 of the augmenting device 300 of the image processing system 1000) receives an existing stream data that does not contain a comment block providing information concerning one or more of the MCUs of one or more of the still images of the stream data. As has been discussed, stream data conforming, at least partly, to one or more versions of the JPEG standard include an image bitstream that is architected to have its images retrieved and decoded sequentially from the beginning of the bitstream.

At 2120, the image bitstream (e.g., the image data 131 as compressed into an image bitstream) is subject to at least entropy decoding to reverse at least the entropy encoding by which its MCUs were finally converted into a bitstream. As has been discussed, as such entropy decoding is performed, the processor component may determine the locations in the image bitstream at which at least some of the blocks of coefficients of at least some of the MCUs (e.g., blocks 136 of coefficients of the MCUs 135) start.

At 2130, entries for a comment block are generated that include pointers to the locations at which at least some blocks of coefficients of at least some MCUs are determined to start in the image bitstream of the image data and that include indications of coefficient values for the DC coefficients of each such block of coefficients of each such MCU. As previously discussed, unlike the value for the DC coefficient specified within each block of coefficients, the value specified by the indications in each entry are not expressed as differences from other coefficients.

At 2140, the existing stream data is augmented with the comment block containing the generated entries, thereby creating a new stream data. As previously discussed, such augmentation may be effected by adding the comment block to a header of the existing stream data.

Figure 12:
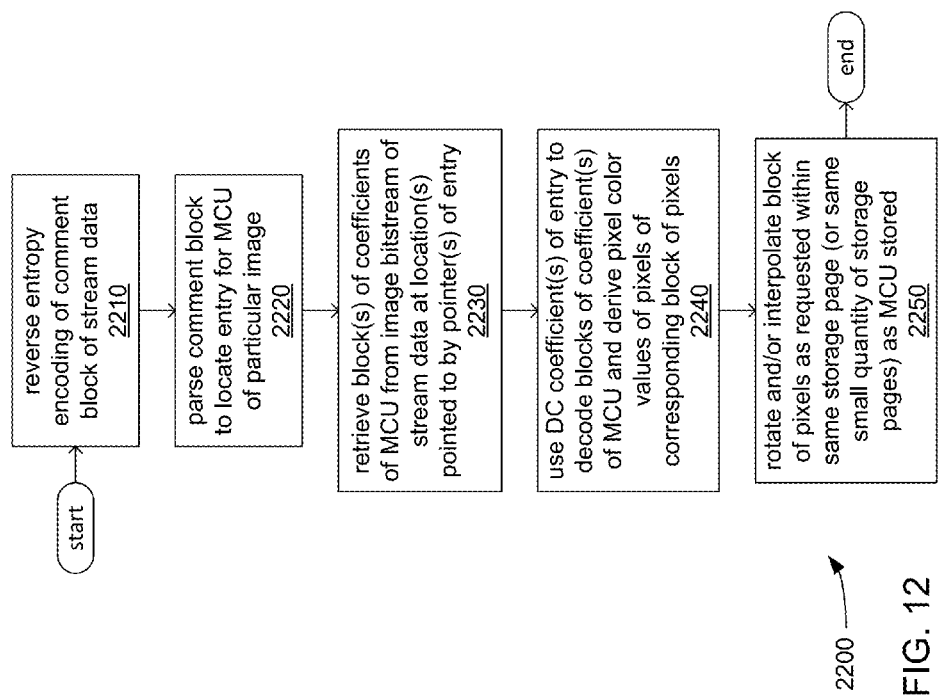

FIG. 12 illustrates one embodiment of a logic flow 2200. The logic flow 2200 may be representative of some or all of the operations executed by one or more embodiments described herein. More specifically, the logic flow 2200 may illustrate operations performed by the processor component 750 in executing at least the control routine 740, and/or performed by other component(s) of the viewing device 700.

At 2210, a processor component of a viewing of an image processing system (e.g., the processor component 750 of the viewing device 700 of the image processing system 1000) performs entropy decoding on a comment block of a stream data to reverse earlier applied entropy encoding. At 2220, the comment block is parsed to locate at least one entry for an MCU of a particular image of the stream data.

At 2230, the one or more sought after MCUs are retrieved from the image bitstream of an image data of the stream data using the pointer(s) of the earlier found entry or entries. As has been discussed, in some embodiments, there may be only one entry for each still image of the stream data, and the pointer(s) of that one entry may point to the block(s) of coefficients of the MCU that corresponds to the first block of pixels of an image. In other embodiments, there may be multiple entries for each still image, and the pointers of those entries may point to the blocks of coefficients of the MCUs that correspond to the first blocks of pixels in each horizontal line of blocks of pixels in that image.

At 2240, the coefficient value(s) of each entry or entries earlier located in the comment block are used in decoding the block(s)s of coefficients of the MCUs to which the pointer(s) of the entry or entries point. As has been discussed, unlike the value for the DC coefficient specified within each block of coefficients of each MCU, the value specified by each indication in each entry is not expressed as a difference from another coefficient. Through the use of the DC coefficients specified within the entry or entries earlier located in the comment data, the color pixel values of one or more blocks of pixels corresponding to one or more MCUs are able to be derived without having to decode the bitstream from its starting point.

As has also been discussed, to reduce storage requirements in the retrieval and/or decoding of images, relatively small subsets of the MCUs may be retrieved at any given time for decoding and/or other processing, instead of retrieving the majority or all of the MCUs of an image. In such embodiments, as the MCUs of each of the small subsets are processed to the extent of fully decoding their blocks of coefficients to derive pixel color data that is then used in at least preparing to visually present the image, may be replaced by MCUs retrieved as part of another of the small subsets.

At 2250, one or more of the blocks of pixels are rotated and/or interpolated as requested in input that may be received though operation of an input device by an operator of the viewing device. The operator may wish to see a particular image in a different orientation on a display of the device and/or may wish to zoom into or out of the image.

As has been further discussed, as part of reducing storage requirements in processing images for visual presentation, the use of small subsets of MCUs may be extended to performing such operations as interpolation and/or rotations on the pixel color values derived from the MCUs in place in the storage, possibly at storage locations that overlap (and therefore, overwrite) the storage locations of the MCUs from which they were derived. Again, this may be done to minimize the quantity of storage pages used to only one storage page or to a relatively small quantity of storage pages.

Figure 13:
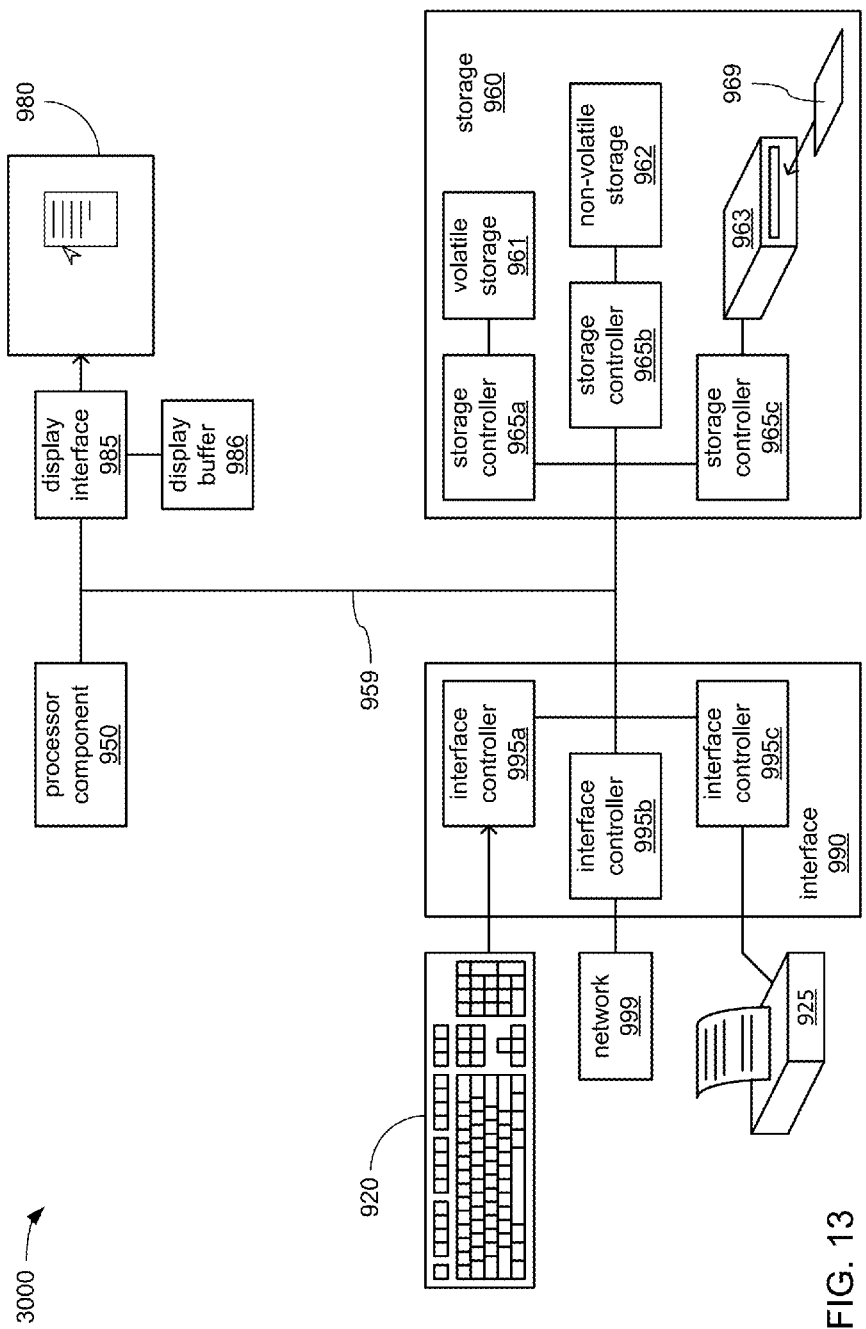
FIG. 13 illustrates a processing architecture according to an embodiment.

FIG. 13 illustrates an embodiment of an exemplary processing architecture 3000 suitable for implementing various embodiments as previously described. More specifically, the processing architecture 3000 (or variants thereof) may be implemented as part of one or more of the computing devices 100, 300, 500 or 700. It should be noted that components of the processing architecture 3000 are given reference numbers in which the last two digits correspond to the last two digits of reference numbers of at least some of the components earlier depicted and described as part of the computing devices 100, 300, 500 and 700. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device includes at least a processor component 950, a storage 960, an interface 990 to other devices, and a coupling 959. As will be explained, depending on various aspects of a computing device implementing the processing architecture 3000, including its intended use and/or conditions of use, such a computing device may further include additional components, such as without limitation, a display interface 985 which may be accompanied by a display buffer 986.

The coupling 959 includes one or more buses, point-to-point interconnects, transceivers, buffers, crosspoint switches, and/or other conductors and/or logic that communicatively couples at least the processor component 950 to the storage 960. Coupling 959 may further couple the processor component 950 to one or more of the interface 990, the audio subsystem 970 and the display interface 985 (depending on which of these and/or other components are also present). With the processor component 950 being so coupled by couplings 959, the processor component 950 is able to perform the various ones of the tasks described at length, above, for whichever one(s) of the aforedescribed computing devices implement the processing architecture 3000. Coupling 959 may be implemented with any of a variety of technologies or combinations of technologies by which signals are optically and/or electrically conveyed. Further, at least portions of couplings 959 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to the processor components 350, 550 and 750) may include any of a wide variety of commercially available processors, employing any of a wide variety of technologies and implemented with one or more cores physically combined in any of a number of ways.

As previously discussed, the storage 960 (corresponding to the storages 360, 560 and 760) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 959 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data.

Thus, a routine including a sequence of instructions to be executed by the processor component 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (possibly corresponding to the interfaces 190, 390 or 690) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, a microphone to monitor sounds of persons to accept commands and/or data signaled by those persons via voice or other sounds they may make, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

Figure 14:
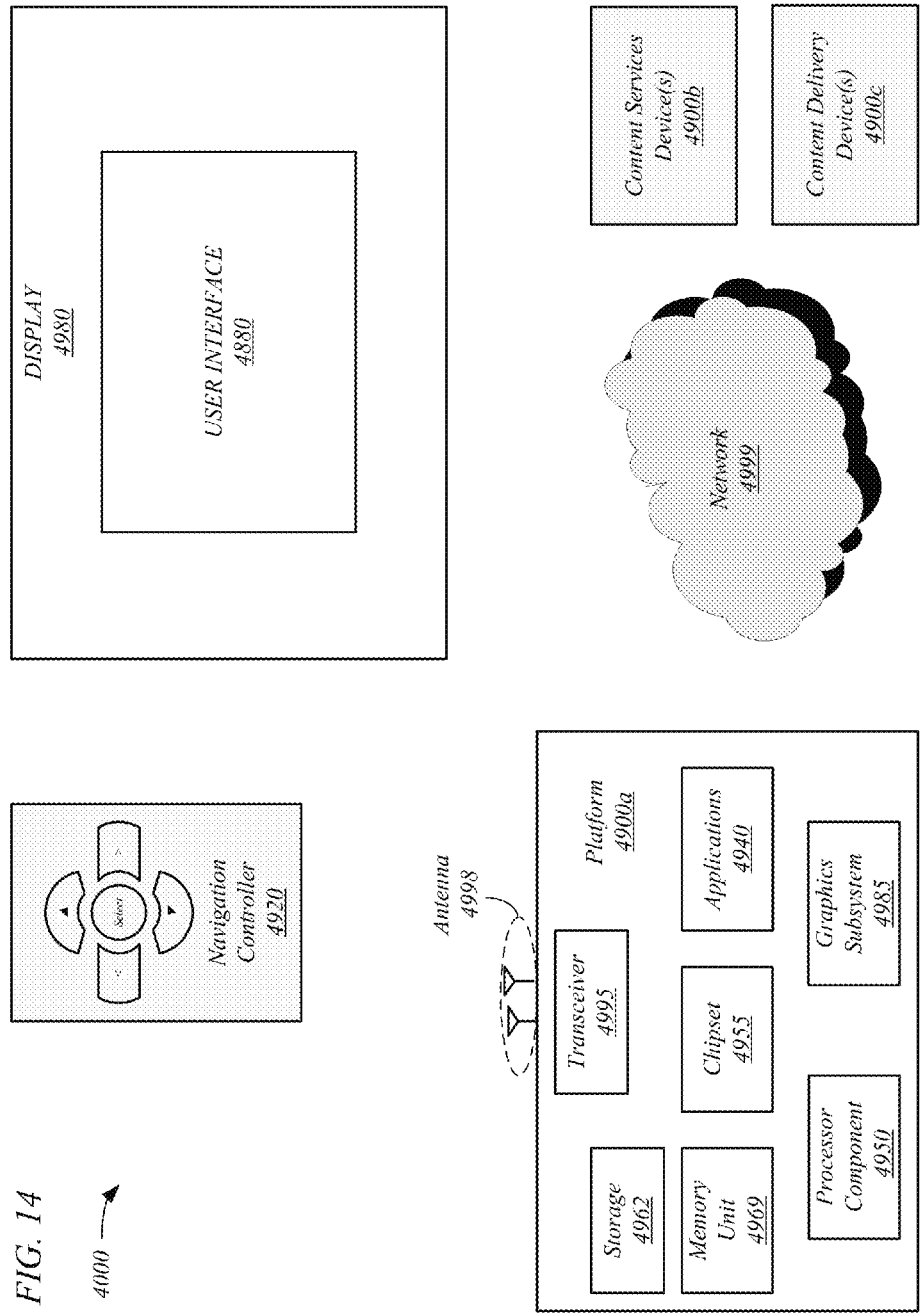
FIG. 14 illustrates another alternate embodiment of a graphics processing system.

FIG. 14 illustrates an embodiment of a system 4000. In various embodiments, system 4000 may be representative of a system or architecture suitable for use with one or more embodiments described herein, such as the image processing system 1000; one or more of the computing devices 100, 300, 500 or 700; and/or one or more of the logic flows 2100 or 2200. The embodiments are not limited in this respect.

As shown, system 4000 may include multiple elements. One or more elements may be implemented using one or more circuits, components, registers, processors, software subroutines, modules, or any combination thereof, as desired for a given set of design or performance constraints. Although FIG. 14 shows a limited number of elements in a certain topology by way of example, it can be appreciated that more or less elements in any suitable topology may be used in system 4000 as desired for a given implementation. The embodiments are not limited in this context.

In embodiments, system 4000 may be a media system although system 4000 is not limited to this context. For example, system 4000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 4000 includes a platform 4900a coupled to a display 4980. Platform 4900a may receive content from a content device such as content services device(s) 4900c or content delivery device(s) 4900d or other similar content sources. A navigation controller 4920 including one or more navigation features may be used to interact with, for example, platform 4900a and/or display 4980. Each of these components is described in more detail below.

In embodiments, platform 4900a may include any combination of a processor component 4950, chipset 4955, memory unit 4969, transceiver 4995, storage 4962, applications 4940, and/or graphics subsystem 4985. Chipset 4955 may provide intercommunication among processor circuit 4950, memory unit 4969, transceiver 4995, storage 4962, applications 4940, and/or graphics subsystem 4985. For example, chipset 4955 may include a storage adapter (not depicted) capable of providing intercommunication with storage 4962.

Processor component 4950 may be implemented using any processor or logic device, and may be the same as or similar to one or more of processor components 350, 550 or 750, and/or to processor component 950 of FIG. 13.

Memory unit 4969 may be implemented using any machine-readable or computer-readable media capable of storing data, and may be the same as or similar to storage media 969 of FIG. 13.

Transceiver 4995 may include one or more radios capable of transmitting and receiving signals using various suitable wireless communications techniques, and may be the same as or similar to transceiver 995b in FIG. 13.

Display 4980 may include any television type monitor or display, and may be the same as or similar to one or more of displays 580 and 780, and/or to display 980 in FIG. 13.

Storage 4962 may be implemented as a non-volatile storage device, and may be the same as or similar to non-volatile storage 962 in FIG. 13.

Graphics subsystem 4985 may perform processing of images such as still or video for display. Graphics subsystem 4985 may be a graphics processing unit (GPU) or a visual processing unit (VPU), for example. An analog or digital interface may be used to communicatively couple graphics subsystem 4985 and display 4980. For example, the interface may be any of a High-Definition Multimedia Interface, DisplayPort, wireless HDMI, and/or wireless HD compliant techniques. Graphics subsystem 4985 could be integrated into processor circuit 4950 or chipset 4955. Graphics subsystem 4985 could be a stand-alone card communicatively coupled to chipset 4955.

The graphics and/or image processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

In embodiments, content services device(s) 4900b may be hosted by any national, international and/or independent service and thus accessible to platform 4900a via the Internet, for example. Content services device(s) 4900b may be coupled to platform 4900a and/or to display 4980. Platform 4900a and/or content services device(s) 4900b may be coupled to a network 4999 to communicate (e.g., send and/or receive) media information to and from network 4999. Content delivery device(s) 4900c also may be coupled to platform 4900a and/or to display 4980.

In embodiments, content services device(s) 4900b may include a cable television box, personal computer, network, telephone, Internet enabled devices or appliance capable of delivering digital information and/or content, and any other similar device capable of unidirectionally or bidirectionally communicating content between content providers and platform 4900a and/display 4980, via network 4999 or directly. It will be appreciated that the content may be communicated unidirectionally and/or bidirectionally to and from any one of the components in system 4000 and a content provider via network 4999. Examples of content may include any media information including, for example, video, music, medical and gaming information, and so forth.

Content services device(s) 4900b receives content such as cable television programming including media information, digital information, and/or other content. Examples of content providers may include any cable or satellite television or radio or Internet content providers. The provided examples are not meant to limit embodiments.

In embodiments, platform 4900a may receive control signals from navigation controller 4920 having one or more navigation features. The navigation features of navigation controller 4920 may be used to interact with a user interface 4880, for example. In embodiments, navigation controller 4920 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 4920 may be echoed on a display (e.g., display 4980) by movements of a pointer, cursor, focus ring, or other visual indicators displayed on the display. For example, under the control of software applications 4940, the navigation features located on navigation controller 4920 may be mapped to virtual navigation features displayed on user interface 4880. In embodiments, navigation controller 4920 may not be a separate component but integrated into platform 4900*a* and/or display 4980. Embodiments, however, are not limited to the elements or in the context shown or described herein.

In embodiments, drivers (not shown) may include technology to enable users to instantly turn on and off platform 4900*a* like a television with the touch of a button after initial boot-up, when enabled, for example. Program logic may allow platform 4900*a* to stream content to media adaptors or other content services device(s) 4900*b* or content delivery device(s) 4900*c* when the platform is turned "off." In addition, chip set 4955 may include hardware and/or software support for 5.1 surround sound audio and/or high definition 7.1 surround sound audio, for example. Drivers may include a graphics driver for integrated graphics platforms. In embodiments, the graphics driver may include a peripheral component interconnect (PCI) Express graphics card.

In various embodiments, any one or more of the components shown in system 4000 may be integrated. For example, platform 4900*a* and content services device(s) 4900*b* may be integrated, or platform 4900*a* and content delivery device(s) 4900*c* may be integrated, or platform 4900*a*, content services device(s) 4900*b*, and content delivery device(s) 4900*c* may be integrated, for example. In various embodiments, platform 4900*a* and display 4890 may be an integrated unit. Display 4980 and content service device(s) 4900*b* may be integrated, or display 4980 and content delivery device(s) 4900*c* may be integrated, for example. These examples are not meant to limit embodiments.

In various embodiments, system 4000 may be implemented as a wireless system, a wired system, or a combination of both. When implemented as a wireless system, system 4000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 4000 may include components and interfaces suitable for communicating over wired communications media, such as I/O adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth. Platform 4900*a* may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 14.

Figure 15:
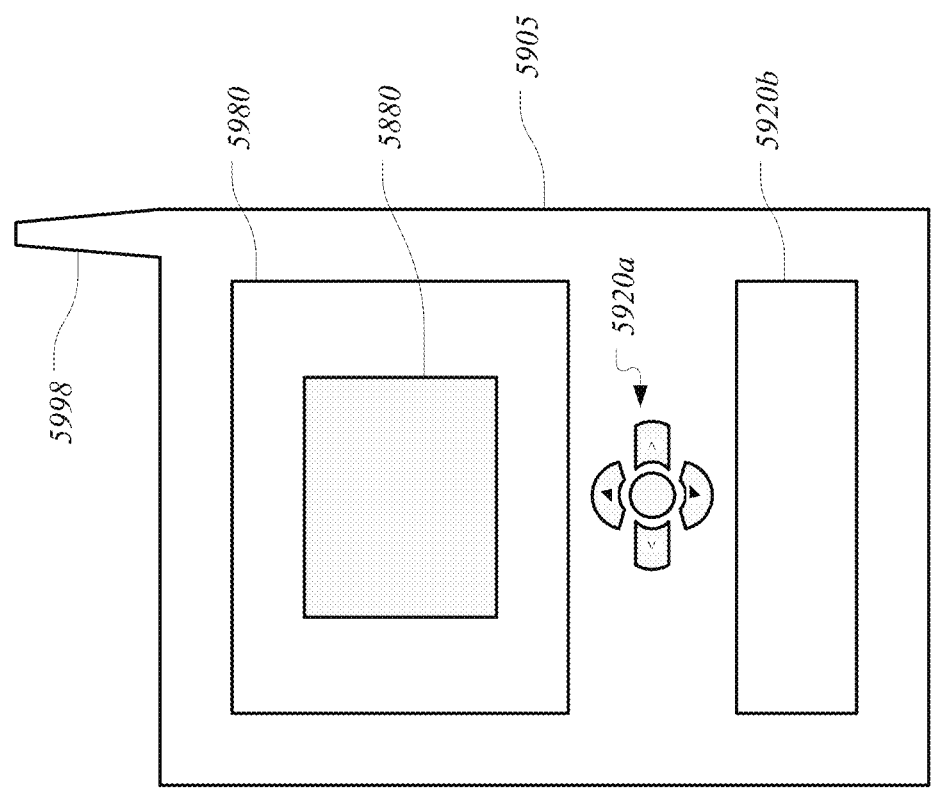
FIG. 15 illustrates an embodiment of a device.

As described above, system 4000 may be embodied in varying physical styles or form factors. FIG. 15 illustrates embodiments of a small form factor device 5000 in which system 4000 may be embodied. In embodiments, for example, device 5000 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 15, device 5000 may include a display 5980, a navigation controller 5920*a*, a user interface 5880, a housing 5905, an I/O device 5920*b*, and an antenna 5998. Display 5980 may include any suitable display unit for displaying information appropriate for a mobile computing device, and may be the same as or similar to display 4980 in FIG. 14. Navigation controller 5920*a* may include one or more navigation features which may be used to interact with user interface 5880, and may be the same as or similar to navigation controller 4920 in FIG. 14. I/O device 5920*b* may include any suitable I/O device for entering information into a mobile computing device. Examples for I/O device 5920*b* may include an alphanumeric keyboard, a numeric keypad, a touch pad, input keys, buttons, switches, rocker switches, microphones, speakers, voice recognition device and software, and so forth. Information also may be entered into device 5000 by way of a microphone. Such information may be digitized by a voice recognition device. The embodiments are not limited in this context.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

In Example 1, a device to display compressed images includes a processor component; a parsing component for execution by the processor component to parse a comment block of stream data to locate an entry associated with an image of multiple images, the stream data comprising an image bitstream of the multiple images, and the entry comprising a pointer to a location within the image bitstream at which a block of coefficients of a minimum coded unit (MCU) of the image begins and an indication of a coefficient of the block of coefficients; and a decoding component for execution by the processor component to retrieve the MCU from the image bitstream and employ the indication to decode the block of coefficients.

In Example 2, which includes the subject matter of Example 1, the device may include a storage device divided into multiple storage pages, the decoding component to retrieve multiple MCUs from the image bitstream and to store a block of coefficients of each of the multiple MCUs in a single storage page of the multiple storage pages, the multiple MCUs comprising the MCU.

In Example 3, which includes the subject matter of any of Examples 1-2, the device may include a display buffer; and a presentation component for execution by the processor component to copy a block of pixel color values derived by decoding the block of coefficients from the single storage page and into the display buffer for visual presentation on a display, the decoding component to decode the block of coefficients within the single storage page.

In Example 4, which includes the subject matter of any of Examples 1-3, the presentation component may reorganize pixel color values of the block of pixel color values within a portion of the single storage page occupied by the block of pixel color values to rotate the image.

In Example 5, which includes the subject matter of any of Examples 1-4, the decoding component to reverse an entropy encoding of the comment block to enable parsing of the comment block.

In Example 6, which includes the subject matter of any of Examples 1-5, the indication may include an indication of a value of a DC coefficient of the block of coefficients, the block of coefficients comprising the DC coefficient and multiple AC coefficients.

In Example 7, which includes the subject matter of any of Examples 1-6, the decoding component to perform entropy decoding, inverse quantization and an inverse discrete cosine transform on the block of coefficients to derive pixel color values corresponding to the block of coefficients.

In Example 8, which includes the subject matter of any of Examples 1-7, the parsing component may parse the comment block to locate multiple entries associated with the image, the multiple entries comprising the entry, each entry of the multiple entries associated with a MCU of multiple MCUs that corresponds to a block of pixels of a different horizontal row of blocks of pixels of the image.

In Example 9, which includes the subject matter of any of Examples 1-8, the decoding component may retrieve each MCU of the multiple MCUs from the image bitstream and employ an indication of a value of a DC coefficient of each entry of the multiple entries to decode a block of coefficients of a corresponding MCU of the multiple MCUs.

In Example 10, which includes the subject matter of any of Examples 1-9, the device may include an augmenting component for execution by the processor component to decode the image bitstream to determine the location within the image bitstream at which the block of coefficients begins, to generate the entry in the comment block, and to augment a header of the stream data with the comment block.

In Example 11, which includes the subject matter of any of Examples 1-10, the device may include at least one of a display to visually present the image or an interface to couple the processor component to a network receive the stream data from the network.

In Example 12, a device to process compressed images includes a processor component, a decoding component for execution by the processor component to perform entropy decoding of an image bitstream of multiple images to determine a location in the image bitstream at which a block of coefficients of a minimum coded unit (MCU) of an image of the multiple images begins and to determine a value of a DC coefficient of the block of coefficients, and an augmenting component for execution by the processor component to add a comment block comprising an entry indicative of the location and of the value to the stream data, the stream data comprising the image bitstream.

In Example 13, which includes the subject matter of Example 12, the augmenting component may perform entropy encoding of the comment block to reduce the size of the comment block.

In Example 14, which includes the subject matter of any of Examples 12-13, the augmenting component may add the comment block to a header of the stream data to cause the comment block to be ignored by a decompressor of another device that decodes the stream data.

In Example 15, which includes the subject matter of any of Examples 12-14, the augmenting component may add the comment block to the stream data in a manner compliant with a version of the Joint Photographic Experts Group (JPEG) specification.

In Example 16, which includes the subject matter of any of Examples 12-15, the device may include a comment component to generate multiple entries in the comment block associated with the image, the multiple entries comprising the entry, each entry of the multiple entries associated with a MCU that corresponds to a block of pixels of a different horizontal row of blocks of pixels of the image.

In Example 17, which includes the subject matter of any of Examples 12-16, the device may include an interface to couple the processor component to a network to receive the stream data from the network prior to adding the comment block to the stream data or to transmit the stream data to another device via the network after adding the comment block to the stream data.

In Example 18, a computing-implemented method for display compressed images includes parsing a comment block of stream data to locate an entry associated with an image of multiple images, the stream data comprising an image bitstream of the multiple images, and the entry comprising a pointer to a location within the image bitstream at which a block of coefficients of a minimum coded unit (MCU) of the image begins and an indication of a coefficient of the block of coefficients; retrieving the MCU from the image bitstream; and employing the indication to decode the block of coefficients.

In Example 19, which includes the subject matter of Example 18, the method may include retrieving multiple MCUs from the image bitstream; and storing a block of coefficients of each of the multiple MCUs in a single storage page of a storage device divided into multiple storage pages, the multiple MCUs comprising the MCU.

In Example 20, which includes the subject matter of any of Examples 18-19, the method may include decoding the block of coefficients within the single storage page; and copying a block of pixel color values derived by decoding the block of coefficients from the single storage page and into a display buffer for visual presentation on a display.

In Example 21, which includes the subject matter of any of Examples 18-20, the method may include reorganizing pixel color values of the block of pixel color values within a portion of the single storage page occupied by the block of pixel color values to rotate the image.

In Example 22, which includes the subject matter of any of Examples 18-21, the method may include performing entropy decoding of the comment block to enable the parsing of the comment block.

In Example 23, which includes the subject matter of any of Examples 18-22, the indication may include an indication of a value of a DC coefficient of the block of coefficients, the block of coefficients comprising the DC coefficient and multiple AC coefficients.

In Example 24, which includes the subject matter of any of Examples 18-23, the method may include performing entropy decoding, inverse quantization and an inverse discrete cosine transform on the block of coefficients to derive pixel color values corresponding to the coefficients.

In Example 25, which includes the subject matter of any of Examples 18-24, the method may include parsing the comment block to locate multiple entries associated with the image, the multiple entries comprising the entry, each entry of the multiple entries associated with a MCU of multiple MCUs that corresponds to a block of pixels of a different horizontal row of blocks of pixels of the image.

In Example 26, which includes the subject matter of any of Examples 18-25, the method may include retrieving each MCU of the multiple MCUs from the image bitstream, and employing an indication of a value of a DC coefficient of each entry of the multiple entries to decode a block of coefficients of a corresponding MCU of the multiple MCUs.

In Example 27, which includes the subject matter of any of Examples 18-26, the method may include decoding the image bitstream to determine the location within the image bitstream at which the block of coefficients begins; generating the entry in the comment block; and augmenting a header of the stream data with the comment block.

In Example 28, which includes the subject matter of any of Examples 18-27, the method may include at least one of visually presenting the image on a display or receiving the stream data from a network.

In Example 29, at least one machine-readable storage medium includes instructions that when executed by a computing device, cause the computing device to parse a comment block of stream data to locate an entry associated with an image of multiple images, the stream data comprising an image bitstream of the multiple images, and the entry comprising a pointer to a location within the image bitstream at which a block of coefficients of a minimum coded unit (MCU) of the image begins and an indication of a coefficient of the block of coefficients; retrieve the MCU from the image bitstream; and employ the indication to decode the block of coefficients.

In Example 30, which includes the subject matter of Example 29, the computing device may be caused to retrieve multiple MCUs from the image bitstream; and store a block of coefficients of each of the multiple MCUs in a single storage page of a storage device divided into multiple storage pages, the multiple MCUs comprising the MCU.

In Example 31, which includes the subject matter of any of Examples 29-30, the computing device may be caused to decode the block of coefficients within the single storage page; and copy a block of pixel color values derived by decoding the block of coefficients from the single storage page and into a display buffer for visual presentation on a display of the computing device.

In Example 32, which includes the subject matter of any of Examples 29-31, the computing device may be caused to reorganize pixel color values of the block of pixel color values within a portion of the single storage page occupied by the block of pixel color values to rotate the image.

In Example 33, which includes the subject matter of any of Examples 29-32, the computing device may be caused to perform entropy decoding of the comment block to enable the parsing of the comment block.

In Example 34, which includes the subject matter of any of Examples 29-33, the indication may include an indication of a value of a DC coefficient of the block of coefficients, the block of coefficients comprising the DC coefficient and multiple AC coefficients.

In Example 35, which includes the subject matter of any of Examples 29-34, the computing device may be caused to perform entropy decoding, inverse quantization and an inverse discrete cosine transform on the block of coefficients to derive pixel color values corresponding to the coefficients.

In Example 36, which includes the subject matter of any of Examples 29-35, the computing device may be caused to parse the comment block to locate multiple entries associated with the image, the multiple entries comprising the entry, each entry of the multiple entries associated with a MCU of multiple MCUs that corresponds to a block of pixels of a different horizontal row of blocks of pixels of the image.

In Example 37, which includes the subject matter of any of Examples 29-36, the computing device may be caused to retrieve each MCU of the multiple MCUs from the image bitstream, and employ an indication of a value of a DC coefficient of each entry of the multiple entries to decode a block of coefficients of a corresponding MCU of the multiple MCUs.

In Example 38, which includes the subject matter of any of Examples 29-37, the computing device may be caused to decode the image bitstream to determine the location within the image bitstream at which the block of coefficients begins, generate the entry in the comment block, and augment a header of the stream data with the comment block.

In Example 39, which includes the subject matter of any of Examples 29-30, the computing device may be caused to visually present the image on a display.

In Example 40, which includes the subject matter of any of Examples 29-30, the computing device may be caused to receive the stream data from a network.

In Example 41, at least one machine-readable storage medium may include instructions that when executed by a processor component, cause the processor component to perform any of the above.

In Example 42, an apparatus to display compressed images may include means for performing any of the above.

The invention claimed is:

1. A device to display compressed images comprising:
   a parsing component to receive stream data and parse a comment block included within a header of an image bitstream to locate an entry from a plurality of entries within the comment block associated with an image of multiple images within the image bitstream, the entry comprising a pointer to a location within the image bitstream at which a block of coefficients of a minimum coded unit (MCU) of the image begins and an indication of a coefficient of the block of coefficients; and
   a decoding component to retrieve the MCU from the image bitstream and employ the indication to decode the block of coefficients.

2. The device of claim 1, comprising a storage device divided into multiple storage pages, the decoding component to retrieve multiple MCUs from the image bitstream and to store a block of coefficients of each of the multiple MCUs in a single storage page of the multiple storage pages, the multiple MCUs comprising the MCU.

3. The device of claim 2, comprising:
   a display buffer; and
   a presentation component to copy a block of pixel color values derived by decoding the block of coefficients from the single storage page and into the display buffer for visual presentation on a display, the decoding component to decode the block of coefficients within the single storage page.

4. The device of claim 3 the presentation component to reorganize pixel color values of the block of pixel color values within a portion of the single storage page occupied by the block of pixel color values to rotate the image.

5. The device of claim 1, the parsing component to parse the comment block to locate multiple entries associated with the image, each entry of the multiple entries associated with a MCU of multiple MCUs that corresponds to a block of pixels of a different horizontal row of blocks of pixels of the image.

6. The device of claim 5, the decoding component to retrieve each MCU of the multiple MCUs from the image bitstream and employ an indication of a value of a DC coefficient of each entry of the multiple entries to decode a block of coefficients of a corresponding MCU of the multiple MCUs.

7. The device of claim 1, comprising at least one of a display to visually present the image or an interface to receive the stream data from the network.

8. A device to process compressed images comprising:
   a decoding component to perform entropy decoding of stream data including an image bitstream of multiple images to determine a location in the image bitstream at which a block of coefficients of a minimum coded unit (MCU) of an image of the multiple images begins and to determine a value of a DC coefficient of the block of coefficients; and
   an augmenting component to add a comment block to a header of the image bitstream, the comment block comprising a plurality of entries, at least one entry indicative of the location in the image bitstream at which the block of coefficients of the MCU begins and the value of the DC coefficient of the block of coefficients, the comment block configured to be ignored by a decompressor of another device that decoded the stream data.

9. The device of claim 8, the augmenting component to perform entropy encoding of the comment block to reduce the size of the comment block.

10. The device of claim 8, comprising a comment component to generate multiple entries in the comment block associated with the image, each entry of the multiple entries associated with a MCU that corresponds to a block of pixels of a different horizontal row of blocks of pixels of the image.

11. The device of claim 8, comprising at least one of a display to visually present the image or an interface to receive the stream data from a network prior to adding the comment block to the stream data or to transmit the stream data to another device via the network after adding the comment block to the stream data.

12. A computer-implemented method for displaying compressed images comprising:
receiving stream data including an image bitstream;
parsing a comment block including within header of the image bitstream to locate an entry from a plurality of entries within the comment block associated with an image of multiple images within the image bitstream, the entry comprising a pointer to a location within the image bitstream at which a block of coefficients of a minimum coded unit (MCU) of the image begins and an indication of a coefficient of the block of coefficients;
retrieving the MCU from the image bitstream; and
employing the indication to decode the block of coefficients.

13. The computer-implemented method of claim 12, comprising
retrieving multiple MCUs from the image bitstream; and
storing a block of coefficients of each of the multiple MCUs in a single storage page of a storage device divided into multiple storage pages, the multiple MCUs comprising the MCU.

14. The computer-implemented method of claim 13, comprising:
decoding the block of coefficients within the single storage page; and
copying a block of pixel color values derived by decoding the block of coefficients from the single storage page and into a display buffer for visual presentation on a display.

15. The computer-implemented method of claim 12, comprising parsing the comment block to locate multiple entries associated with the image, each entry of the multiple entries associated with a MCU of multiple MCUs that corresponds to a block of pixels of a different horizontal row of blocks of pixels of the image.

16. The computer-implemented method of claim 15, comprising:
retrieving each MCU of the multiple MCUs from the image bitstream; and
employing an indication of a value of a DC coefficient of each entry of the multiple entries to decode a block of coefficients of a corresponding MCU of the multiple MCUs.

17. At least one non-transitory machine-readable storage medium comprising instructions that when executed by a computing device, cause the computing device to:
receive stream data including an image bitstream;
parse a comment block included within a header of the image bitstream to locate an entry from a plurality of entries within the comment block associated with an image of multiple images within the image bitstream, the entry comprising a pointer to a location within the image bitstream at which a block of coefficients of a minimum coded unit (MCU) of the image begins and an indication of a coefficient of the block of coefficients;
retrieve the MCU from the image bitstream; and
employ the indication to decode the block of coefficients.

18. The at least one non-transitory machine-readable storage medium of claim 17, the computing device caused to:
retrieve multiple MCUs from the image bitstream; and
store a block of coefficients of each of the multiple MCUs in a single storage page of a storage device divided into multiple storage pages, the multiple MCUs comprising the MCU.

19. The at least one non-transitory machine-readable storage medium of claim 18, the computing device caused to:
decode the block of coefficients within the single storage page; and
copy a block of pixel color values derived by decoding the block of coefficients from the single storage page and into a display buffer for visual presentation on a display of the computing device.

20. The at least one non-transitory machine-readable storage medium of claim 19, the computing device caused to reorganize pixel color values of the block of pixel color values within a portion of the single storage page occupied by the block of pixel color values to rotate the image.

21. The at least one non-transitory machine-readable storage medium of claim 17, the computing device caused to perform entropy decoding of the comment block to enable the parsing of the comment block.

22. The at least one non-transitory machine-readable storage medium of claim 17, the computing device caused to parse the comment block to locate multiple entries associated with the image, the multiple entries comprising the entry, each entry of the multiple entries associated with a MCU of multiple MCUs that corresponds to a block of pixels of a different horizontal row of blocks of pixels of the image.

23. The at least one non-transitory machine-readable storage medium of claim 22, the computing device caused to:
retrieve each MCU of the multiple MCUs from the image bitstream; and
employ an indication of a value of a DC coefficient of each entry of the multiple entries to decode a block of coefficients of a corresponding MCU of the multiple MCUs.

24. The at least one non-transitory machine-readable storage medium of claim 17, the computing device caused to:
decode the image bitstream to determine the location within the image bitstream at which the block of coefficients begins;
generate the entry in the comment block; and
augment a header of the stream data with the comment block.

* * * * *